(12) United States Patent
Kakutani

(10) Patent No.: US 8,724,164 B2
(45) Date of Patent: May 13, 2014

(54) PRINTING DEVICE, PRINTING METHOD AND PROGRAM THEREOF

(71) Applicant: Seiko Epson Corporation, Tokyo (JP)

(72) Inventor: Toshiaki Kakutani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/676,563

(22) Filed: Nov. 14, 2012

(65) Prior Publication Data

US 2013/0120769 A1    May 16, 2013

(30) Foreign Application Priority Data

Nov. 15, 2011  (JP) ................... 2011-249677

(51) Int. Cl.
  *G06K 15/10*  (2006.01)
(52) U.S. Cl.
  USPC ........... 358/1.8; 358/1.9; 358/1.14; 358/1.15; 347/9; 347/15; 347/43
(58) Field of Classification Search
  USPC ............ 358/1.8, 1.9, 1.14, 1.15, 3.06; 347/9, 347/15, 43
  See application file for complete search history.

(56) References Cited

U.S. PATENT DOCUMENTS

| | | | |
|---|---|---|---|
| 5,341,228 A | 8/1994 | Parker et al. | |
| 2006/0146082 A1* | 7/2006 | Nunokawa et al. | 347/15 |
| 2007/0273899 A1* | 11/2007 | Yazawa et al. | 358/1.8 |
| 2008/0266608 A1* | 10/2008 | Yamazaki et al. | 358/3.06 |
| 2011/0069100 A1* | 3/2011 | Yasutani et al. | 347/9 |

FOREIGN PATENT DOCUMENTS

| | | |
|---|---|---|
| JP | 2011-121250 A | 6/2011 |
| JP | 2011-207068 A | 10/2011 |

* cited by examiner

*Primary Examiner* — Allen H Nguyen
(74) *Attorney, Agent, or Firm* — Global IP Counselors, LLP

(57) ABSTRACT

A printing device includes the following features. The first dot group in which dots are formed based on the first printing condition and the second dot group in which dots are formed based on a printing condition which is different from the first printing condition are formed together in a common region. In the common region, when the printing is performed in a plurality of conditions such that a difference of the dot pitch between a formation position of dots belonging to the first pixel group and a formation position of dots belonging to the second pixel group is 2/720 inch to 5/720 inch, the change in CIEL*a*b* of the printed image is within the preliminary determined range.

13 Claims, 24 Drawing Sheets

DOTS FORMED DURING FORWARD ACTION

PIXELS IN WHICH DOTS ARE
TO BE FORMED
DURING FORWARD ACTION

DOTS FORMED DURING REVERSE ACTION

PIXELS IN WHICH DOTS ARE
TO BE FORMED
DURING REVERSE ACTION

DOTS FORMED
DURING FORWARD AND REVERSE ACTION

MAIN SCANNING
DIRECTION
←→

SECONDARY
SCANNING DIRECTION
↕

CASE OF APPROXIMATE SINGLE PIXEL SHIFT

CASE OF APPROXIMATE DOUBLE PIXEL SHIFT

CYAN

SHIFT AMOUNT OF DOT FORMATION POSITION
(UNIT: PIXEL)

| L* | | −10 | −5 | 0 | 2 | 5 | 10 | 20 | ΔL |
|---|---|---|---|---|---|---|---|---|---|
| R=0 | P | 66.5 | 66.5 | 66.5 | 66.4 | 66.3 | 66.5 | 66.4 | 0.2 |
| | N | 66.2 | 66.3 | 64.9 | 65.0 | 66.0 | 65.9 | 66.1 | 1.4 |
| R=32 | P | 67.4 | 67.4 | 67.5 | 67.4 | 67.4 | 67.2 | 67.3 | 0.3 |
| | N | 67.2 | 67.0 | 66.1 | 66.2 | 67.0 | 67.1 | 67.1 | 1.1 |
| R=64 | P | 69.4 | 69.4 | 69.5 | 69.2 | 69.3 | 69.3 | 69.2 | 0.3 |
| | N | 68.9 | 69.0 | 68.0 | 68.3 | 69.1 | 69.2 | 69.3 | 1.3 |
| R=96 | P | 72.1 | 72.2 | 72.4 | 72.2 | 72.1 | 72.2 | 72.1 | 0.3 |
| | N | 72.2 | 72.0 | 70.9 | 71.4 | 71.9 | 72.1 | 72.0 | 1.3 |
| R=128 | P | 75.9 | 76.0 | 75.9 | 75.9 | 76.0 | 75.9 | 75.9 | 0.1 |
| | N | 75.7 | 75.7 | 74.9 | 74.9 | 75.6 | 75.6 | 75.5 | 0.9 |

G=B=255

MAGENTA SHIFT AMOUNT OF DOT FORMATION POSITION
(UNIT: PIXEL)

| L* | | −10 | −5 | 0 | 2 | 5 | 10 | 20 | ΔL |
|---|---|---|---|---|---|---|---|---|---|
| G=0 | P | 56.44 | 56.24 | 56.54 | 56.39 | 56.33 | 56.38 | 56.32 | 0.3 |
| | N | 55.81 | 55.91 | 54.89 | 54.71 | 55.97 | 55.66 | 55.88 | 1.3 |
| G=32 | P | 57.38 | 57.55 | 57.56 | 57.3 | 57.47 | 57.21 | 57.17 | 0.4 |
| | N | 56.85 | 57.23 | 55.78 | 55.8 | 56.93 | 56.68 | 56.65 | 1.5 |
| G=64 | P | 59.51 | 59.77 | 59.83 | 59.68 | 59.55 | 59.58 | 59.64 | 0.3 |
| | N | 59.33 | 59.4 | 57.97 | 58.24 | 59.18 | 58.94 | 59.32 | 1.4 |
| G=96 | P | 62.7 | 62.51 | 62.79 | 62.66 | 62.56 | 62.77 | 62.6 | 0.3 |
| | N | 62.48 | 62.5 | 61.06 | 61.74 | 62.42 | 62.25 | 62.15 | 1.4 |
| G=128 | P | 67.95 | 68.17 | 68 | 67.8 | 68.03 | 67.84 | 67.83 | 0.4 |
| | N | 67.93 | 67.91 | 66.67 | 66.74 | 67.6 | 67.74 | 67.85 | 1.3 |

YELLOW SHIFT AMOUNT OF DOT FORMATION POSITION
(UNIT: PIXEL)

| b* | | −10 | −5 | 0 | 2 | 5 | 10 | 20 | Δb |
|---|---|---|---|---|---|---|---|---|---|
| B=0 | P | 78.91 | 79.39 | 78.41 | 79.05 | 79.28 | 79.71 | 78.77 | 1.3 |
| | N | 79.45 | 80.08 | 84.33 | 83.7 | 79.78 | 79.92 | 80.03 | 4.9 |
| B=32 | P | 77.01 | 77.66 | 76.76 | 77.41 | 77.84 | 77.04 | 77.51 | 1.1 |
| | N | 78.22 | 78.25 | 82.63 | 81.92 | 77.87 | 78.19 | 78.07 | 4.8 |
| B=64 | P | 70.68 | 70.92 | 70.96 | 70.48 | 71.17 | 70.93 | 70.3 | 0.9 |
| | N | 71.38 | 71.87 | 76.08 | 74.24 | 71.02 | 70.65 | 70.42 | 5.7 |
| B=96 | P | 60.39 | 60.52 | 59.94 | 59.97 | 61.12 | 60.86 | 60.31 | 1.2 |
| | N | 61.75 | 61.58 | 66.03 | 63.41 | 61.05 | 61.3 | 61.09 | 5.0 |
| B=128 | P | 47.19 | 47.91 | 46.9 | 47.97 | 47.78 | 47.42 | 47.75 | 1.1 |
| | N | 47.96 | 47.9 | 51.56 | 51.14 | 48.38 | 48.17 | 47.8 | 3.8 |

CYAN

SHIFT AMOUNT OF DOT FORMATION POSITION
(UNIT: PIXEL)

| a* | | -10 | -5 | 0 | 2 | 5 | 10 | 20 | Δa |
|---|---|---|---|---|---|---|---|---|---|
| R=0 | P | -17.39 | -17.27 | -17.35 | -17.16 | -17.42 | -17.3 | -17.39 | 0.3 |
| | N | -17.71 | -17.39 | -18.62 | -18.25 | -17.62 | -17.48 | -17.55 | 1.2 |
| R=32 | P | -16.8 | -16.64 | -16.35 | -16.47 | -16.79 | -16.95 | -16.71 | 0.6 |
| | N | -16.81 | -16.8 | -17.61 | -17.47 | -16.92 | -16.94 | -17.04 | 0.8 |
| R=64 | P | -15.49 | -15.59 | -15.43 | -15.6 | -15.59 | -15.78 | -15.74 | 0.4 |
| | N | -15.75 | -15.64 | -16.79 | -16.3 | -15.76 | -15.82 | -15.63 | 1.2 |
| R=96 | P | -14.68 | -14.52 | -14.24 | -14.45 | -14.67 | -14.46 | -14.53 | 0.4 |
| | N | -14.71 | -14.76 | -15.83 | -15.03 | -14.75 | -14.25 | -14.34 | 1.6 |
| R=128 | P | -12.53 | -12.22 | -12.34 | -12.11 | -12.08 | -12.37 | -12.42 | 0.4 |
| | N | -12.49 | -12.37 | -13.26 | -13.05 | -12.55 | -12.84 | -12.82 | 0.9 |

MAGENTA

SHIFT AMOUNT OF DOT FORMATION POSITION
(UNIT: PIXEL)

| a* | | -10 | -5 | 0 | 2 | 5 | 10 | 20 | Δa |
|---|---|---|---|---|---|---|---|---|---|
| G=0 | P | -27.81 | -27.9 | -27.6 | -27.78 | -27.79 | -27.75 | -27.78 | 0.3 |
| | N | -27.85 | -27.81 | -28.79 | -29.01 | -27.74 | -28.03 | -27.8 | 1.3 |
| G=32 | P | -27.05 | -26.81 | -26.89 | -27.09 | -26.87 | -27.22 | -27.23 | 0.4 |
| | N | -27.18 | -26.7 | -28.12 | -28.06 | -26.9 | -27.21 | -27.2 | 1.4 |
| G=64 | P | -26.24 | -26.06 | -26.1 | -26.21 | -26.25 | -26.36 | -26.31 | 0.3 |
| | N | -26.26 | -26.14 | -27.64 | -27.37 | -26.25 | -26.52 | -26.11 | 1.5 |
| G=96 | P | -24.68 | -24.87 | -24.69 | -24.7 | -24.71 | -24.6 | -24.75 | 0.3 |
| | N | -24.5 | -24.54 | -26.08 | -25.25 | -24.67 | -24.71 | -24.7 | 1.6 |
| G=128 | P | -21.8 | -21.56 | -21.85 | -21.95 | -21.7 | -21.92 | -21.97 | 0.4 |
| | N | -21.74 | -21.69 | -23.09 | -22.83 | -21.85 | -21.85 | -21.97 | 1.4 |

| Gradation Value S | Paired Dot Prediction Value H (S) | Paired Dot Prediction Value m (S) |
|---|---|---|
| 0 | | |
| 1 | 0 | 0 |
| 2 | 0 | 0 |
| 3 | 0 | 0 |
| 4 | 1 | 0 |
| 5 | 1 | 1 |
| 6 | 2 | 1 |
| 7 | 3 | 2 |
| 8 | 4 | 3 |
| 9 | 5 | 4 |
| 10 | 6 | 5 |
| 11 | 7 | 6 |
| 12 | 9 | 7 |
| 13 | 10 | 8 |
| 14 | 12 | 9 |
| 15 | 14 | 11 |
| 16 | 16 | 12 |
| 17 | 18 | 14 |
| 18 | 20 | 16 |
| 19 | 22 | 18 |
| 20 | 25 | 20 |
| 21 | 27 | 22 |
| 22 | 30 | 24 |
| 23 | 33 | 26 |
| 24 | 36 | 29 |
| 25 | 39 | 31 |
| 26 | 42 | 34 |
| 27 | 45 | 36 |
| 28 | 49 | 39 |
| 29 | 52 | 42 |
| 30 | 56 | 45 |
| 31 | 60 | 48 |
| 32 | 64 | 51 |

Fig. 15

Shift Dither Mask
(Reverse Threshold Value Shifted by 4 Pixels to Left, Shifted by 3 Pixels to Up)

Shift Dither Mask
(Reverse Threshold Value Shifted by 3 Pixels to Left)(Raster-Alternateness-Mode)

SHIFTED BY 2 PIXELS

SHIFTED BY 1 PIXEL

SHIFTED BY 4 PIXELS

NOT SHIFTED

SHIFTED BY 3 PIXELS

PRINTING DEVICE, PRINTING METHOD AND PROGRAM THEREOF

CROSS-REFERENCE TO RELATED APPLICATIONS

This application claims priority to Japanese Patent Application No. 2011-249677 filed on Nov. 15, 2011. The entire disclosure of Japanese Patent Application No. 2011-249677 is hereby incorporated herein by reference.

BACKGROUND

1. Technical Field

The present invention relates to a printing technology for printing an image by using dots.

2. Background Technology

A technology for reproducing multi-gradation images is used in a printing device such as a printer in which one or more types of dots are recorded on a printing medium. In recent years, multi-gradation technologies have been dramatically developed so that it is possible to produce so-called photographic quality images by combining two small and large sizes of multi-colored dots such as cyan (C), magenta (M), yellow (Y), and black (K), and controlling the distribution of these dots. For the arrangement of these dots, there are a dot concentration form, which concentrates dots as a typical halftone dot type, and a dot dispersion form, which disperses dots as many as possible in the arrangement. In a case of the dot dispersion form, because of advances in the technology for analyzing a distribution of dots in a spatial frequency range, it is well known that an image quality can now be improved by maintaining in the dot distribution noise characteristics where the number of components at or below a predetermined frequency is kept as low as possible in a spatial frequency range.

These noise characteristics are typically blue noise characteristics. The blue noise refers, for example, to characteristics in which the spatial frequencies of the image formed with dots uniformly to reproduce an image having a constant gradation value include substantially no components at or below a predetermined frequency. While human eyes are sensitive to the low-frequency components below a certain level, but the high-frequency components are not very visible. Thus, images with these blue noise characteristics have a smooth, high-quality feel. A well-known image formation technology having the blue noise characteristics has been disclosed in Patent Document 1.

U.S. Pat. No. 5,341,228 (Patent Document 1) is an example of the related art.

In one of the methods for forming dots on a printing medium, serial printers are used to form dots in the forward and reverse actions of the print head in a width direction of the printing medium (hereinafter, the head movement in this direction calls a main scanning). Among these serial printers, an inkjet printer performs forming dots by discharging ink droplets onto the printing medium from a nozzle. For discharging the ink droplets, it is well known as a method of using a deformation of a piezo-element caused by increasing voltage or a method of using foam (bubbles) generated by heating the ink, or the like. With any of the methods, it is necessary the plurality of main scanning of the print head to form images by the dots. With that, to achieve an improvement of the printing speed, the technology has been developed as a bi-directional printing (as called BI-D printing) to form an image with the combination of dots formed by the reverse action of the print head and the forward action of the print head. Also, to achieve an improvement of the formed image quality, the technology has been developed as a multipath printing to complete each raster by the plurality of main scanning of the print head.

In the image forming technology of the plurality of main scanning by the print head, it causes the reduced image quality due to the shift between a formation position of the dots formed by the first main scanning and a formation position of the dots formed by another main scanning. There are the printing devices to establish an appropriate formation position of dots so that a particular position of the dots is formed without shifting. However, the problem of the shift appears significantly in these printing devices. In a printer which performs printing by the dot formation in the dot concentration form, FIG. 28 is an explanatory drawing showing one example of the dot arrangements in a case where the dot formation positions are shifted in the forward action and the reverse action. In FIG. 28, the symbol "○" is shown as a dot formation position formed at the forward action time and the symbol "●" is shown as a dot formation position formed at the reverse action time. FIG. 28A shows in a case where the dot formation position is completely adjusted so that the dot formation positions at the forward action time and the reverse action time are not shifted (hereinafter, it calls "shift 0 in the positional relationship"). The size of dots in FIG. 28 is the smallest true circle which totally covers each pixel assumed as rectangle accordance with horizontal and vertical resolutions.

FIG. 28B shows dots forming aspect in a case where the dot formation positions at the forward action time and the reverse action time were shifted by 1 pixel in the main scanning direction from shift 0 in the positional relationship. In the similar manner, FIG. 28C shows in a case of the dot formation position shifted by 2 pixels in the main scanning direction. FIG. 28D shows in a case of the dot formation position shifted by 3 pixels in the main scanning direction. FIG. 28E shows in a case of the dot formation position shifted by 4 pixels in the main scanning direction. As shown in the drawings, as the dot formation positions in the main scanning direction at the forward action time and the reverse action time become deviating from shift 0 in the positional relationship, the dot arrangement in the dot concentration form was destroyed and the ratio of that each dot independently covers one pixel was increased. Also, in this case, even though the same numbers of dots were arranged, it understood that the ratio of that dots cover the surface of the printing medium was increased (hereinafter, it calls "coverage"). In a case of changing the dot coverage, it changes the brightness of images (brightness, density, reflectance or the like) or the color tone (color phase or colorfulness). In particular, FIG. 28 shows an example of when dots are alternately formed in each raster at the forward action time and the reverse action time. However, when dots are formed in a column arrangement at the forward action time and the reverse action time or when dots are formed in a crossed arrangement (checker board design), it does not change the occurrence of the change in the brightness or the color tone of the images.

On the other hand, there is a printer using the dot arrangement in the dot dispersion form. For example, in the printer which performs printing dots including the blue noise characteristics as discussed above, when forming an image with the lower gradation values, the dots are preferably not close to each other in the arrangement. However, as discussed above, in a case where the dot forming position during the forward action and the reverse action are shifted from the shift 0 position, the arrangement of the dots are deviated from the preferred arrangement. In general, in the dot arrangement in the dot dispersion form, when the dot formation position is shifted, the overlapping dots are increased so that in contrast with the dot concentration form, the coverage in the dot dispersion form is reduced. In this case, the change in the brightness or the color tone of the images can occur as a result of the coverage variation.

SUMMARY

Problems to be Solved by the Invention

As discussed above, in the image forming technologies which combine dots formed by different main scanning respectively, the shift of the dot formation position in each main scanning appears the reduced image quality in the formed images. In particular, it makes the change in the gradation values and the color tone. An advantage of the invention is to solve the aforementioned problems. The shift of the dots is typically caused by an error at the time of the bi-directional printing in which the dots are formed respectively during the forward action and the reverse action of the print head. However, this is not always the case. For example, it is well known that an error occurs in the multi-pass printing method in which a single raster is formed by multiple passes in the main scanning direction. This error can occur even if the main scanning is limited to a single direction printing.

A phenomenon is also known in which a shift occurs in the landing positions of ink droplets, that is, in the formation positions of dots, due to buckling of the printing medium, such as printing paper absorbing ink and buckling ("cockling"). A shift in the formation position of dots does not occur only in printing devices using ink droplets. They occur in any type of printer that forms dots in a given region by dividing them into a plurality of pixel groups, including thermal transfer printing devices, thermal sublimation printing devices, and so-called line printers in which a print head is arranged in the width direction of the paper.

Means Used to Solve the Above-Mentioned Problems

An advantage of the invention is to solve at least a part of the aforementioned problems and can be realized in the following embodiments or application examples.

[1] A printing device of the application example 1 is the printing device for printing and forming dots on a printing medium including: a printing unit that prints an image; wherein the printing of the image is performed such that when the dots are formed on the printing medium in accordance with dot data indicating existence or non-existence of a dot formation per each pixel, the dot formation is divided into at least first and second pixel groups, and at least a portion of dot formation in the first and second pixel groups is performed in a common region; wherein the printing unit includes a print head for performing a color printing by multiple color dots in a resolution N (N is a natural number of more than 180) dot per inch (dpi), and when the printing is performed in each of a plurality of conditions of which a relative position between the first pixel group and the second pixel group is different, at least one of following conditions is satisfied; (A) when the printed image is yellow (RGB value: R=G=255, B=0 to 64, when RGB value is 8 bit conversion), color difference in CIEL*a*b* color space of images printed in each of the plurality of different conditions is less than value 2 as a change of b*; (B) when the printed image is magenta (RGB value: R=B=255, G=0 to 64, when RGB value is 8 bit conversion), the color difference in CIEL*a*b* color space of the images printed in each of the plurality of different conditions is less than value 0.5 as a change of L* or less than value 0.5 as a change of a*; and (C) when the printed image is cyan (RGB value: G=B=255, R=0 to 64, when RGB value is 8 bit conversion), the color difference in CIEL*a*b* color space of the images printed in each of the plurality of different conditions is less than value 0.5 as a change of L*.

In this printing device, the color difference in the L*a*b* color space is set in the above range when the printing is performed in a plurality of conditions of which a relative position between the first pixel group and the second pixel group is different so that the changes in the brightness or the color tone of an image are suppressed even when the shift of the dot formation position between the plurality of pixel groups occurs.

The plurality of conditions during the printing can be a case such that: (i) a difference of a dot pitch between a formation position of one dot belonging to the first pixel group and a formation position of dot, which corresponds to the one dot and should be adjacent to the one dot, belonging to the second pixel group is 2/720 inch to 5/720 inch; or (ii) one of the plurality of conditions is that the formation position of dots belonging to each of the first and second pixel groups is a reference position, and another one of the plurality of conditions is that the difference of the formation position of dots belonging to each of the first and second pixel groups is 2/720 inch to 5/720 from the reference position. Even in these cases, the change in the brightness or the color tone of the image is suppressed in the above range.

[2] In the above printing device, the print head includes a dot formation element arranged in a pitch corresponding to a print resolution in a width direction of the print medium, while the printing unit feeds the print medium in a direction intersecting the width direction of the print head, the image is formed by using the print head, and the first pixel group includes dots formed by the dot formation element arranged in a predetermined position in a feeding direction of the print medium of the print head, and the second pixel group includes dots formed by the dot formation element arranged in a position different from the predetermined position in the feeding direction of the print medium of the print head.

In the printing device of the application example, the second pixel group includes dots formed by the dot formation element arranged in a position different from the predetermined position, where the dot formation element is arranged to form dots belonging to the first pixel group, in the feeding direction of the print medium of the print head. In particular, a constitution of a line printer is equipped. In the line printer, there is a case that the shift of the dot formation position occurs but even in this case, the change in the brightness or the color tone is fully suppressed.

[3] Also, in the above printing device, the print head is capable of moving relatively in a main scanning direction as the width direction of the print medium, the printing head includes a plurality of nozzles to discharge ink on the print medium, the nozzles are arranged in a direction intersecting the main scanning direction as a nozzle line, and a plurality of nozzle lines apart from each other is constituted in the main scanning direction, the printing unit forms an image by repeating the main scanning and a secondary scanning as a relative movement of the print medium in a direction intersecting the scan direction, the first and second pixel groups have at least one of relationships of following (I), (II), and (III).

(I) The first pixel group includes dots formed during forward action in the main scanning direction of the print head, and the second pixel group includes dots formed during reverse action in the main scanning direction of the print head (serial+bi-directional); (II) a pixel group includes dots which are formed by the nozzle lines different from each other among the plurality of nozzle lines (serial printer+within nozzle lines); and (III) the first pixel group includes dots formed by one main scanning of the print head, and the second pixel group includes dots formed by anther main scanning different from the one main scanning of the print head (serial printer+multi-pass).

This constitution corresponds to variety of aspects of the serial printer. In this serial printer, even when the shift of the dot formation position in the bi-direction printing, the shift of the dot formation position caused by shifting a position between the nozzle lines to form dots by discharging ink droplets, and the shift of the dot formation position between the main scanning when one raster is completed by multiple main scanning, or the like occur, the change in the brightness or the color tone can be fully suppressed.

[4] In either one of the above printing devices, one of the plurality of conditions is a condition that the dot pitch increases and an occurrence of variation of dot overlapping between the first and second pixel groups converges, and when printing is performed in each of the plurality of conditions including the condition, at least one of following conditions is satisfied; (a) when the printed image is yellow (RGB value: R=G=255, B=0 to 64, when RGB value is 8 bit conversion), color difference of images printed in each of the plurality of different conditions is less than value 1 in the b*; (b) when the printed image is magenta (RGB value: R=B=255, G=0 to 64, when RGB value is 8 bit conversion), the color difference of the images printed in each of the plurality of different conditions is less than value 0.3 in the L* or less than value 0.3 in the a*; and (c) when the printed image is cyan (RGB value: G=B=255, R=0 to 64, when RGB value is 8 bit conversion), the color difference of the images printed in each of the plurality of different conditions is less than value 0.3 in the L*.

In the printing device, in each of the three primary colors representing an image, the change in CIEL*a*b* color space compared to a case that the change in the coverage is fully converged is set in the above range. Thus, even any color is picked, the change in the brightness or the color tone is suppressed when the shift of the dot formation position between the plurality of pixel groups occurs.

[5] In either one of the above printing devices, the print unit includes a head which is capable of forming more than two types of different size dots in one pixel as the dot formation corresponding to the pixel.

Since this printing device is capable of forming more than two types of different size dots, while not only a binary (whether or not dots are formed) but also more than three-valued half toning is performed, there is an advantage that the change in CIEL*a*b* of an image can be suppressed.

[6] In either one of the above printing devices, in addition to color printing by forming multiple color dots, the print head performs single color printing in the same color phase.

In the printing device which performs single color printing, the change in CIEL*a*b* color space can be suppressed and the change in the brightness of an image can be suppressed.

[7] In either one of the above printing devices, in spatial frequency region, a distribution of the dots formed in the common region has noise characteristics possessing a peak located in higher-frequency side than lower-frequency region which is less than the predetermined spatial frequency.

The distribution of the dots has an arrangement of so-called dot dispersion form. It is possible to form a high quality image while the discrepancy of the brightness or the color phase caused by the shift of the dot formation position is fully suppressed.

[8] In either one of the above printing devices, the noise characteristics are a blue noise characteristic or a green noise characteristic. By using these characteristics, it is possible to form a high quality image by suppressing variation in the low frequency which is easy to be recognized by human eyes.

[9] In either one of the above printing devices, the distribution of the dots formed in the common region can be the distribution in a dot concentration form. In the dot concentration form, the shift of the dot formation position between the first and second pixel groups is in a range of 2/720 inch to 5/720 inch of the predetermined pitch. The change in L*a*b* color space of the image formed by the printing unit is set within the preliminary determined range. Thus, when the shift of the dot formation between the first and second pixel groups occurs, the change in the brightness or the color tone can be suppressed.

A printing method or program described below can be realized by the above described printing devices. The functional effects by the printing method or program are the same as the printing devices.

[10] For example, the application example of the printing method is a method for performing color printing by forming color dots on a print medium in a resolution N (N is a natural number of more than 180) dpi. When the dots are formed on the printing medium in accordance with dot data indicating existence or non-existence of a dot formation per each pixel, the dot formation is divided into at least first and second pixel groups, and at least a portion of dot formation in the first and second pixel groups is performed in a common region; wherein the printing process includes performing in each of a plurality of conditions of which a relative position between the first pixel group and the second pixel group is different, at least one of following conditions is satisfied; (A) when the printed image is yellow (RGB value: R=G=255, B=0 to 64, when RGB value is 8 bit conversion), color difference in CIEL*a*b* color space of images printed in each of the plurality of different conditions is less than value 2 as a change of b*; (B) when the printed image is magenta (RGB value: R=B=255, G=0 to 64, when RGB value is 8 bit conversion), the color difference in CIEL*a*b* color space of the images printed in each of the plurality of different conditions is less than value 0.5 as a change of L* or less than value 0.5 as a change of a*; and (C) when the printed image is cyan (RGB value: G=B=255, R=0 to 64, when RGB value is 8 bit conversion), the color difference in CIEL*a*b* color space of the images printed in each of the plurality of different conditions is less than value 0.5 as a change of L*.

[11] Also, the application example of program is executed by a computer to perform color printing by forming color dots on a print medium in a resolution N (N is a natural number of more than 180) dpi. When the dots are formed on the printing medium in accordance with dot data indicating existence or non-existence of a dot formation per each pixel, the dot formation is divided into at least first and second pixel groups, and at least a portion of dot formation in the first and second pixel groups is performed in a common region; wherein the printing function includes performing in each of a plurality of conditions of which a relative position between the first pixel group and the second pixel group is different, at least one of following conditions is satisfied; (A) when the printed image is yellow (RGB value: R=G=255, B=0 to 64, when RGB value is 8 bit conversion), color difference in CIEL*a*b* color space of images printed in each of the plurality of different conditions is less than value 2 as a change of b*; (B)

when the printed image is magenta (RGB value: R=B=255, G=0 to 64, when RGB value is 8 bit conversion), the color difference in CIEL*a*b* color space of the images printed in each of the plurality of different conditions is less than value 0.5 as a change of L* or less than value 0.5 as a change of a*; and (C) when the printed image is cyan (RGB value: G=B=255, R=0 to 64, when RGB value is 8 bit conversion), the color difference in CIEL*a*b* color space of the images printed in each of the plurality of different conditions is less than value 0.5 as a change of L*.

BRIEF DESCRIPTION OF THE DRAWINGS

Referring now to the attached drawings which form a part of this original disclosure:

FIGS. 8A, B are descriptive diagrams showing a relationship between a shift amount of a dot formation position and a change amount ΔL of L* or a change amount Δb of b* for magenta images and yellow images respectively;

FIGS. 9A, B are descriptive diagrams showing a relationship between a shift amount of a dot formation position and a change amount Δa of a* for cyan images and magenta images;

FIG. 15 is a descriptive diagram showing a relationship between gradation values S and paired dot target values m;

DETAILED DESCRIPTION OF EXEMPLARY EMBODIMENTS

A. First Embodiment

The first embodiment of the invention will now be described.

A-1. Device Configuration

Figure 1:
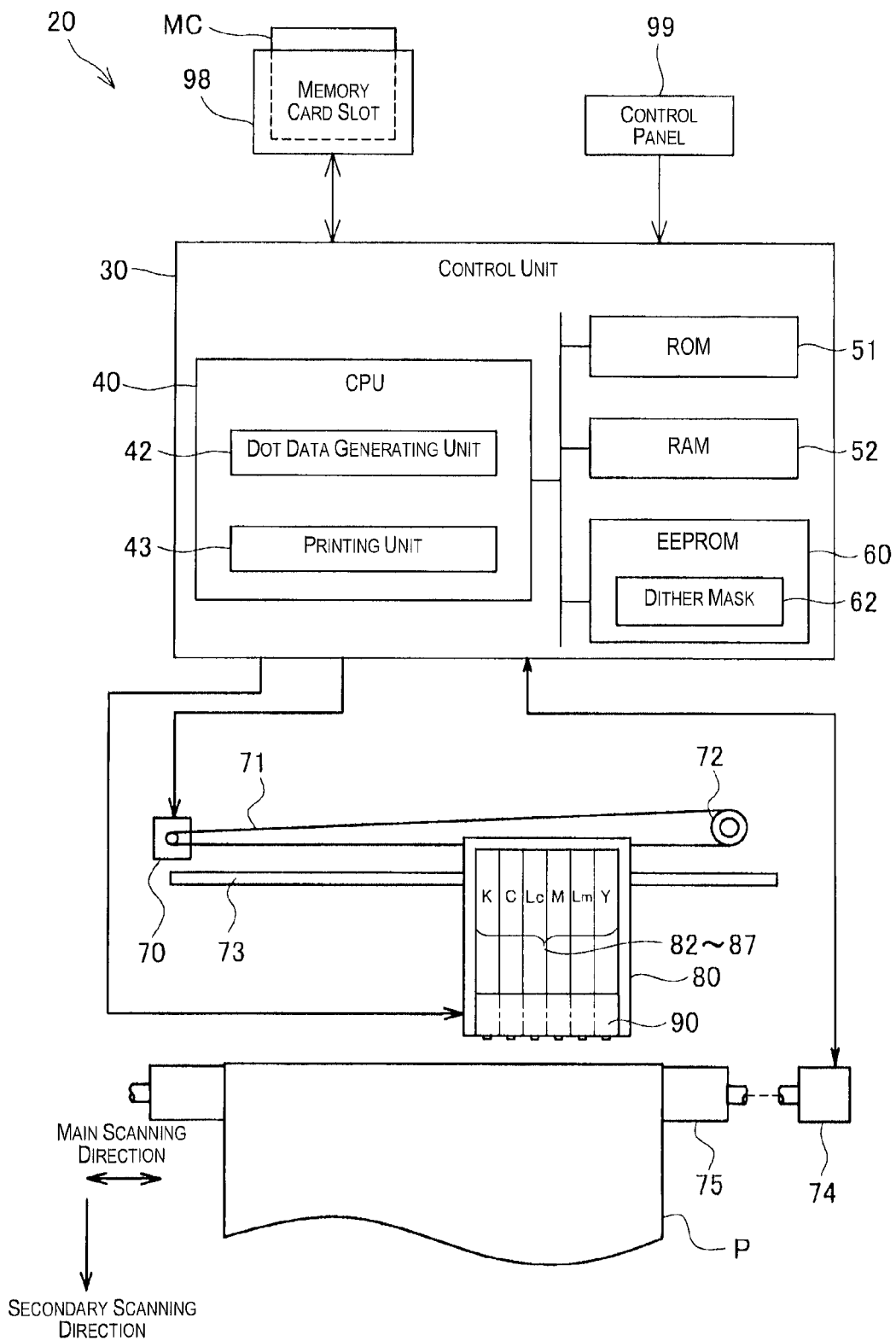
FIG. 1 is a schematic block diagram of the printer 20 in an embodiment of the invention.

FIG. 1 is a schematic block diagram of a printer 20 in the embodiment of the invention. The printer 20 is a serial-type inkjet printer which performs bi-directional printing. As shown, the printer 20 includes a mechanism in which printing paper P is conveyed by a paper feed motor 74, a mechanism in which a carriage 80 is caused to move in a reciprocating manner by a carriage motor 70 in the axial direction of a platen 75, a mechanism in which a print head 90 mounted in the carriage 80 is driven, ink is ejected, and dot formation is performed, and a control unit 30 for governing the interaction of signals among the paper feed motor 74, the carriage motor 70, the print head 90, and the control panel 99.

The mechanism for causing the carriage 80 to move in a reciprocating manner in the axial direction of the platen 75 includes a sliding shaft 73 installed parallel to the axis of the platen 75 to slidably hold the carriage 80, and a pulley 72 over which an endless drive belt 71 has been stretched along with the carriage motor 70.

Ink cartridges 82-87 containing cyan ink (C), magenta ink (M), yellow ink (Y), black ink (K), light cyan ink (Lc), and light magenta ink (Lm) are mounted in the carriage 80. Nozzle columns corresponding to each one of these color inks is formed in the print head 90 at the bottom of the carriage 80. When these ink cartridges 82-87 are mounted in the carriage 80 from above, ink can be supplied from each cartridge to the print head 90

Figure 2:
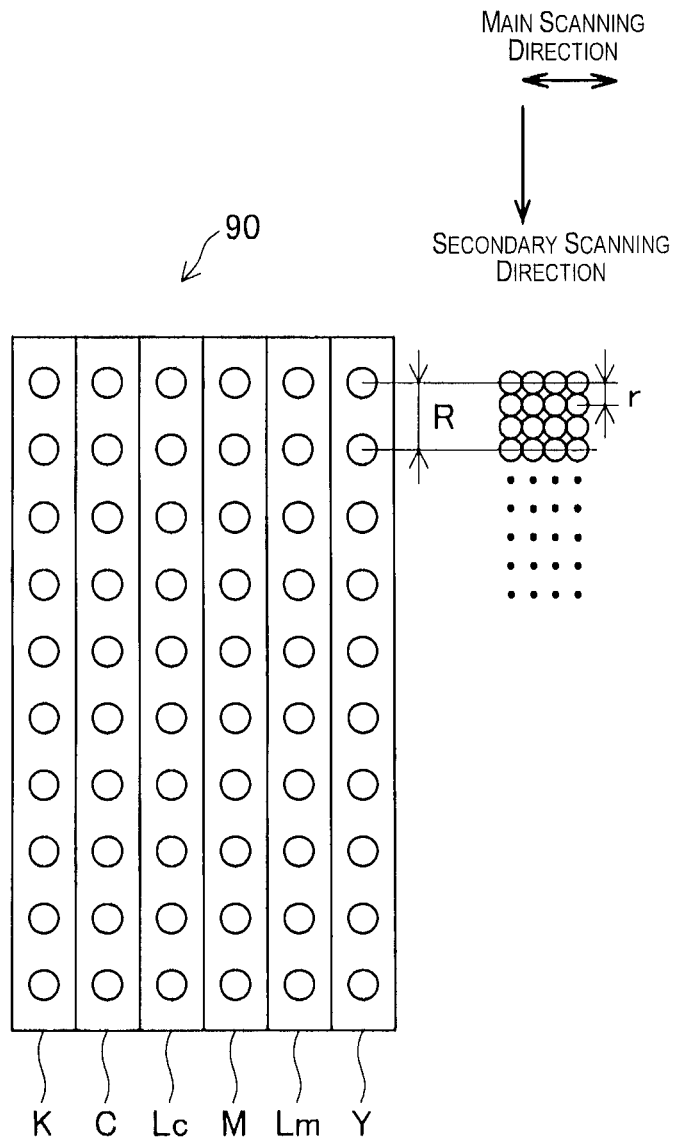
FIG. 2 is a descriptive diagram illustrating the nozzle columns in the print head 90 of this embodiment.

As shown in FIG. 2, nozzle columns corresponding to each one of the color inks are provided in the printing head 90 so that a plurality of nozzles for ejecting ink droplets are arranged in the secondary scanning direction. The arrangement pitch R of the nozzle columns is an integer multiple of the dot formation pitch (raster distance r). The printing is performed using so-called interlacing, in which each raster is completed during the printing process by repeatedly performing multiple main scans while moving the paper in the secondary scanning direction relative to the print head 90 during each main scan. So-called overlap printing can also be performed in which one raster is completed over multiple main scans. As a result, printing can be performed using so-called alternating column dot placement (FIG. 3A) or alternating raster dot placement (FIG. 3B) in which interlacing and overlapping are combined to integrate dots formed in each raster or each column during either forward action or reverse action of the print head 90. Alternatively, printing can be performed using so-called crossed dot placement (FIG. 3C) in which dots formed during forward action and dots formed during reverse action are arranged alternately in each raster and in each column. In the first embodiment, printing is performed using crossed dot placement as shown in FIG. 3C. By these dot placements, the print head 90 performs color printing by using multiple color dots in for example, the resolution of 720×720 dpi. The printing resolution by the print head 90 is more than 180×180 dpi. For example, as a modification, it can be possible to arbitrarily combine the resolution of 180, 240, 360, 720, 1440 dpi or more in the main scanning direction and the resolution of 180, 240, 360, 720, 1440 dpi or more in the secondary scanning direction. Alternatively, it can be possible to have a modification such as the resolution of 300 or 600 dpi (or more). It is well known method that an intended dot placement is realized by using the interlacing and overlapping with the various resolutions. Therefore, the detailed explanation is omitted.

A control unit 30 for controlling the print head 90, the carriage motor 70, and the paper feed motor 74 mentioned above to execute the printing process includes a CPU 40, a ROM 51, a RAM 52, and an EEPROM 60 connected to each other via a bus. The control unit 30 deploys programs stored in the ROM 51 and the EEPROM 60 in the RAM 52 and executes them to control all of the operations of the printer 20. It also functions as the dot data generating unit 42 and the printing unit 43 in the claims. The function units will be described in detail below.

A dither mask 62 is stored in the EEPROM 60. The size of the dither mask 62 used in this embodiment is 64×64, and the threshold values from 0 to 256 are stored in 4096 storage elements. Each threshold value is used in the halftone processing described below. The placement of each threshold value in the dither mask 62 is decided so as to give it characteristics close to those of a so-called blue noise mask. The characteristics of the dither mask 62 used in this embodiment are described in detail below. The configuration is one of a dispersion-type dither mask with high dispersion properties, which is similar to a dither mask used to realize high-quality images.

In this embodiment, the printing is performed by the printer 20 alone. A memory card slot 98 is connected to the control unit 30, and image data ORG is read and inputted from a memory card MC inserted into the memory card slot 98. In this embodiment, the image data ORG inputted from the memory card MC is data with three color components: red (R), green (G), and blue (B). The printer 20 performs printing using images ORG in the memory card MC. In addition, the printer can be connected to an external computer via a USB port and/or LAN, and halftone processing can be performed by the computer. The results can then be received and printed by the printer 20.

In a printer 20 having the hardware configuration described above, the carriage motor 70 is driven to reciprocate the print head 90 relative to the printing paper P in the main scanning direction, and the paper feed motor 74 is driven to move the printing paper P in the secondary scanning direction. The control unit 30 aligns the reciprocating movement of the carriage 80 (main scanning) with the feeding of the print medium (secondary scanning), and drives the nozzles according to the appropriate timing on the basis of printing data to form ink dots of the appropriate color in the appropriate locations on the printing paper P. In this way, it is possible the printer 20 to print color images inputted from a memory card MC on printing paper P.

A-2. Printing Process

Figure 4:
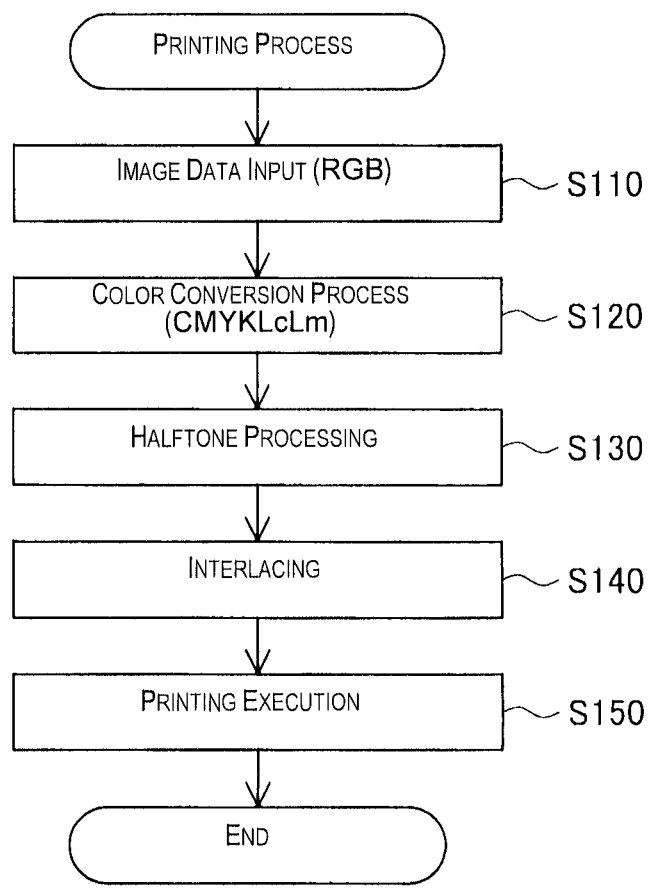
FIG. 4 is a flowchart showing the printing process in this embodiment.

The printing process performed by the printer 20 will now be described. FIG. 4 is a flowchart showing the printing process performed by the printer 20. Here, the user operates the control panel 99 to initiate the printing process by performing a printing instruction operation for a predetermined image stored in the memory card MC. When the printing process has been initiated, the CPU 40 first reads and inputs the RGB-formatted image data ORG to be printed from the memory card MC via the memory card slot 98 (Step S110).

When the image data ORG has been inputted, the CPU 40 references the look-up table (not shown in the drawing) stored in the EEPROM 60, and performs color conversion on the image data ORG from the RGB format to the CMYKLcLm format (Step S120).

When the color conversion process has been performed, the CPU 40 performs a process (referred to below as halftone processing) as the dot data generating unit 42 in which the image data is converted into ON/OFF dot data for each color (referred to below as dot data) (Step S130). In this embodiment, this process is performed using the dither method. In other words, the inputted data is compared to the threshold values stored in the storage elements constituting the dither mask 62 at the positions corresponding to the inputted data. When the inputted data is greater than the threshold value, a determination is made to form a dot (dot ON). When the inputted data is equal to or less than the threshold value, a determination is made not to form a dot (dot OFF). The dither mask 62 used in this process is applied repeatedly in the main scanning direction and the secondary scanning direction with respect to the inputted data aligned in the main scanning direction and the secondary scanning direction. The halftone processing in this embodiment is controlled so that the generated dot data has predetermined characteristics. The content of the control is dependent on the nature of the dither mask 62. The characteristics of the dither mask 62 are described below. The halftone processing is not limited to binary ON/OFF dot processing. It can also be multi-value processing such as ON/OFF processing of large dots and small dots. Also, the image data provided in Step S130 can be obtained from image processing such as resolution conversion processing and smoothing processing.

When the halftone processing has been performed, the CPU 40 performs overlapping and interlacing processes alternatingly aligned with respect to dot pattern data to be printed in a single main scanning unit, harmonized with the nozzle arrangement of the printer 20, the paper feed rate, and other parameters (Step S140). When overlapping and the interlacing processes are performed, the CPU 40 drives the print head 90, the carriage motor 70, and the motor 74 as a process of the printing unit 43, and executes printing (Step S150).

Figure 5A:
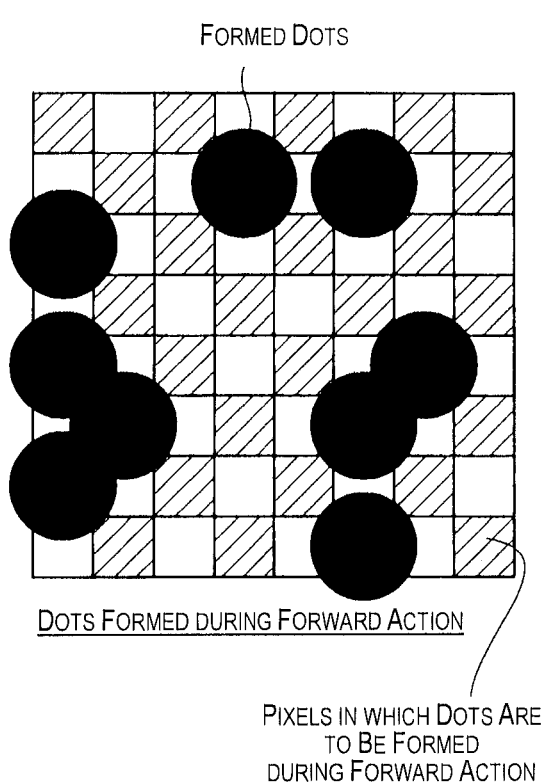
FIGS. 5A-C are descriptive diagrams showing dots formed at the forward action time and the reverse action time, and a combination of these dots.
Figure 5B:
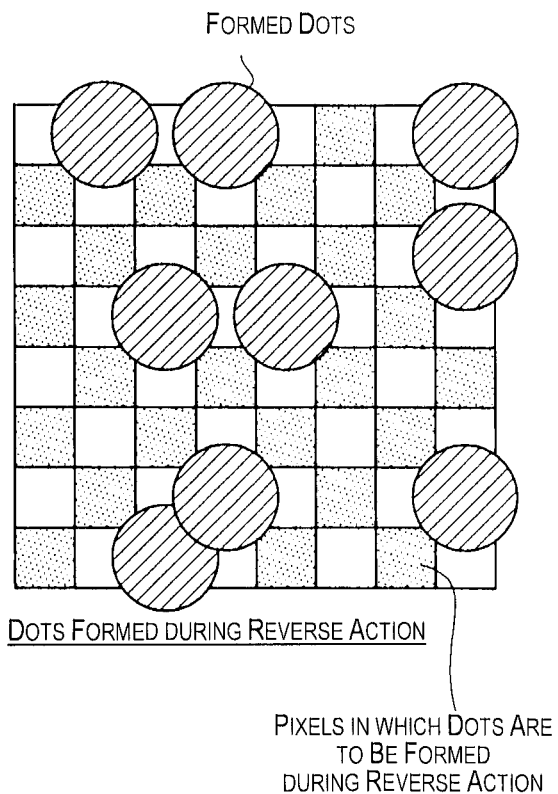

The following is a description of the arrangement of dots formed in this printing process. As is clear from the description provided above, the printer 20 forms dots by ejecting ink from the print head at a plurality of different timings (in other words, forward action and reverse action) in the common print region of the print medium while changing the ink ejection position with respect to the print medium, and a printed image is outputted in which the dots formed during the forward action (referred to below as the forward action dots) and the dots formed during the reverse action (referred to below as the reverse action dots) are aligned with each other. Since the dots in the first embodiment have a crossed arrangement (FIG. 3C), the dots formed during forward action by the print head 90 are formed in pixel positions arranged in an alternating manner as indicated by the cross-hatching in FIG. 5A, and the dots formed during the reverse action by the print head 90 are formed in pixel positions arranged in an alternating manner shifted one pixel in the column direction with respect to the dot positions during forward action as indicated by the shading in FIG. 5B. The grouping of pixels corresponding to the dots formed during forward action is called the first pixel group, and the grouping of pixels corresponding to the dots formed during reverse action is called the second pixel group. In FIGS. 5A and 5B, the dots that are actually formed are indicated by the symbol "●" and hatched the symbol "○", respectively. The dot size is set to be larger than the diagonal size of the pixels so that the surface of the print medium can be covered 100% at maximum density, even when there is some discrepancy in dot formation positions. In the printed image, the dots formed in the first and second pixel groups are aligned as shown in FIG. 5C.

As long as the dot formation positions formed during the forward action and the reverse action are completely adjusted, the dots in the main scanning direction and in the secondary scanning direction are formed in the complete staggered position shown in FIG. 3 as a diagram. This configuration is called as that the dot distance is 0. FIG. 5C shows a case that the dot distance is 0. In particular, FIG. 5C shows that the dots were formed in the complete staggered position during the forward action and the reverse action. In the bi-directional printing, the dot formation position can be shifted and it can occur that the printing is performed with a condition different from the condition of that the dot distance is 0. Thus, there is a case that the actual formed dots are different from FIG. 5C. For example, when the dot formation position during the forward action is shifted by approximately 1 pixel in the raster direction (main scanning direction) with respect to the dot formation position during the reverse action in the example shown in FIG. 5C, the dots formed during the forward action is shifted in the main scanning direction as shown in FIG. 6A and as a result, the area where the dots are overlapped is increased. Also, as shown in FIG. 6B, the area where the dots are overlapped is more increased in a case that the shift amount is increased to 2.

Figure 5C:
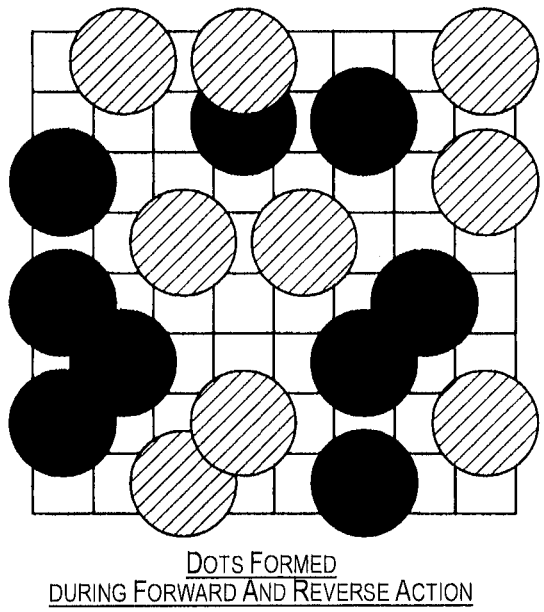
Figure 6A:
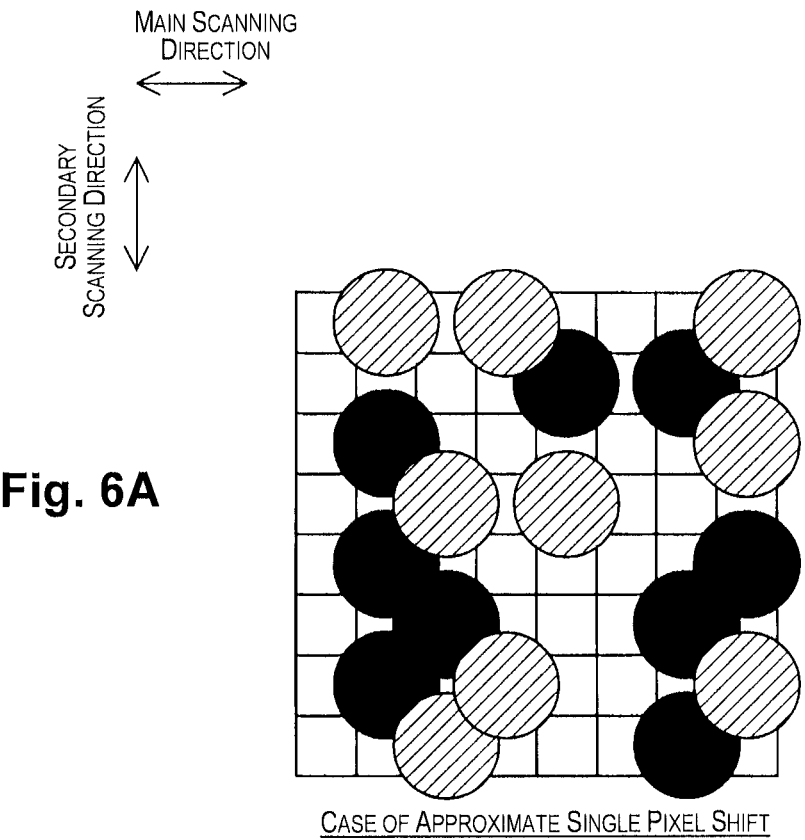
FIGS. 6A, B are descriptive diagrams illustrating cases in which there is a shift in the dot formation position at the forward action time and the reverse action time.
Figure 6B:
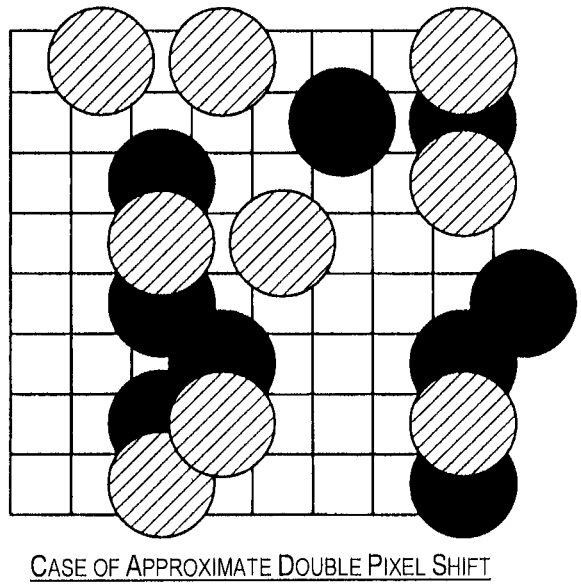

Without any shifts, as shown in FIG. 5C, there is very little overlap between dots. This is because the dots are separated as much as possible in a dither mask having blue noise characteristics. In contrast, when a shift occurs in the dot formation position during actual printing and a space between the dots becomes larger, the amount of overlap increases between the dots belonging to the first pixel group formed during forward action and the dots belonging to the second pixel group formed during reverse action as shown in FIG. 6A and FIG. 6B. When the amount of dot overlap increases, the coverage which is the percentage of printing paper P covered by dots changes. Dots that are not adjacent to each other when there is no shift in the dot formation position can be formed in adjacent positions when there is a shift in the dot formation position. In this case, the coverage changes with respect to a part overlapped by the dot gain. In the present embodiment, the resolution is 720×720 dpi and it is shifted by 2 pixels so that the dot distance between the dots belonging to the pixel group formed during the main action and the dots belonging to the pixel group formed during the reverse action corresponds to $2/720$ inch. Even though it is shifted by 2 pixels which are the same, when the resolution is for example, 300×300 dpi, the dot distance becomes $2/300$ inch which is larger value.

A-3. Halftone Processing

With these points in mind, the characteristics of the halftone processing in the first embodiment will now be described. In the first embodiment, the halftone processing indicated as Step S130 in FIG. 4 makes a decision whether or not a dot is to be formed in a given pixel position by comparing the gradation values for the pixel belonging to the first pixel group and the pixel belonging to the second pixel group to the dither mask 62 stored in the EEPROM 60. The data indicating the decision on whether a dot is to be turned ON or OFF is called dot data.

As already described, the dither mask 62 used to generate dot data is set to have high dispersion properties even this is lower than the blue noise mask. The phrase "high dispersion properties" means to have noise characteristics in which in a spatial frequency range, the dispersion of the formed dots has a peak in the high frequency side more than the low frequency region which is equal to or less than the predetermined spatial frequency. In the threshold value placement of the dither mask 62 in the first embodiment, the ratio of the dot overlapping or the dots adjacent to each other in the dot arrangement combined with the dots formed during the forward action and the dots formed during the reverse action is decided such that for example, the ratio is lower than the dot arrangement in accordance with the white noise characteristics but the ratio is higher than the dot arrangement in accordance with the blue noise mask. Thus, when the dither mask 62 in the first embodiment is used, the change of the coverage is controlled even though the shift of the dot formation position during the forward and reverse action is occurred.

In the dither mask 62 used for the halftone processing in the present embodiment, when the printing is performed in which the dot distance of the dot formation during the forward action and the reverse action becomes the predetermined distance ranges of $2/720$ inch to $5/720$ inch, the placement of each threshold value is set such that the change in CIEL*a*b* color space of an image formation will be in a range discussed below.

(A) When the printed image is yellow (RGB value: R=G=255, B=0 to 64, when RGB value is 8 bit conversion), the change of b* in the CIEL*a*b* color space is less than value 2 in the range.

(B) When the printed image is magenta (RGB value: R=B=255, G=0 to 64, when RGB value is 8 bit conversion), the change of L* in the CIEL*a*b* color space is less than value 0.5 or the change of a* is less than value 0.5 in the range.

(C) When the printed image is cyan (RGB value: G=B=255, R=0 to 64, when RGB value is 8 bit conversion), the change of L* in the CIEL*a*b* color space is less than value 0.5 in the range.

A plurality of cases such that a difference of the dot distance from the dot formation position belonging to the first pixel group to the dot formation position belonging to the second pixel group is $2/720$ inch to $5/720$ inch means that the dot distance in one case performed printing and the dot distance in another case have a difference of 2/720 to 5/720. In general, the dot formation position of the forward action and the reverse action in the bi-directional printing is adjusted by some kind of methods. When a status after the adjustment is called as the first case (first setting) and a status after occurring a shift of the dot formation position through the use of printing is called as the second case (second setting), these cases can be treated as a plurality of cases having a difference of the dot distance. Temporally this called as just described, when the dots belonging to the first pixel group are formed with respect to the formation position of the dots belonging to the second pixel group, there is no shifting as a default position (position of the dot distance=0) in the first case. In particular, it is determined as a case that the dots belonging to the first pixel group are formed in the right place with respect to the dots belonging to the second pixel group. In other words, it can be a case that the dots belonging to the first pixel group are formed in the preliminary determined place relative to the formation position of the dots belonging to the second pixel group. With respect to the first case, the second case is a case that the dots are formed in a position shifted by a predetermined distance in the ranges of 2/720 inch to 5/720 inch from the first position where the dots are formed in the first case. Also, the first and second cases can be defined when the first case is defined as a default case in shipping (reference case). When the dots are formed in the first and second cases respectively, as a result of the halftone processing by using the dither mask 62 having the above characteristics, the printer 20 in the present embodiment provide effects discussed below.

A-4. Effect of the Embodiment

In a printer 20 of the first embodiment with the configuration described above, image data ORG is received, processing is performed as shown in FIG. 4 by the control unit 30, and an image is printed on printing paper P. At this time, halftone processing is performed on the gradation value of each pixel constituting the image using the dithering method with the dither mask 62 to convert them to the distribution of dots. Dispersion properties take precedence in the dither mask 62, which is a dispersion-type dither mask with characteristics typical of a blue noise mask. As a result, the image quality of an image produced by this halftone processing and expressed by the dot distribution has a low sense of graininess and high reproducibility of the image.

In addition, even though the printing is performed in the plurality of cases that the dot formation position is different during the forward and reverse action, the variation of overlapping the dots formed during the forward action and the dots formed during the reverse action is controlled so that the change in the CIEL*a*b* color space of an image formation is in the above range of (A) or (C). To be realized for these characteristics, in the first embodiment, in a pixel which is an adjacent relationship between a pixel forming the dots during the forward action of the print head 90 belonging to the first pixel group and a pixel forming the dots during the reverse action belonging to the second pixel group, in particular, the dot formation probability in a pair pixel is set higher than the blue noise mask. As a result, even though the shift is occurred during the forward action and the reverse action, the variation of the coverage for the dot formation is small so that there is a characteristic such that the change of the gradation or the change of the color tone in an image is difficult to occur. This point is explained by using FIG. 7 and FIG. 9.

Figures 7A, 7B:
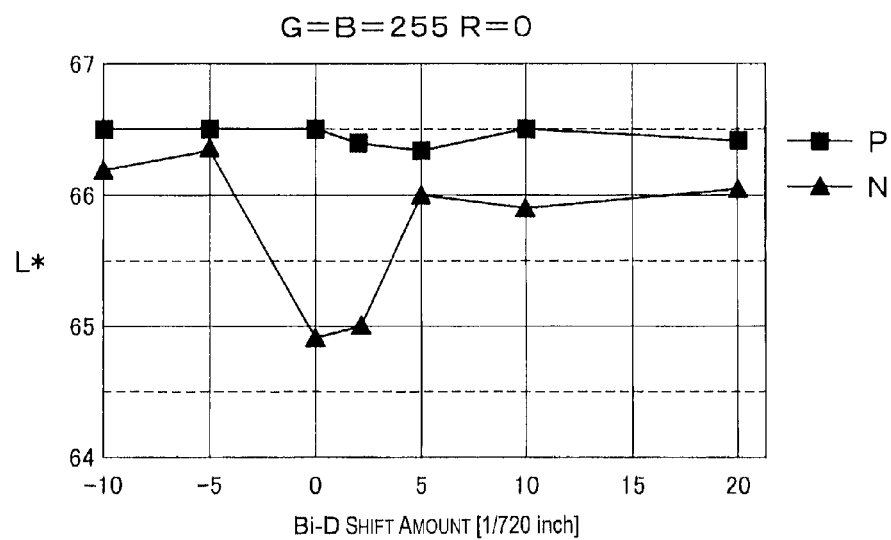
FIGS. 7A, B are descriptive diagrams showing a relationship between a shift amount of a dot formation position and a change amount ΔL of L* for cyan images.

FIG. 7 is a descriptive diagram showing a relationship between a shift amount of a dot formation position (pixel unit) and a change amount ΔL of L* in the L*a*b color space when an image is formed with the cyan color uniformly in the resolution of 720×720 dpi. When the color of printing images shows RGB (8 bit in each color) and it is set as G=B=255, FIG. 7A shows a value of L* in a case of changing 0, 32, 64, 96, 128 for R. In FIG. 7A, the symbol "P" refers to a value of L* when the dither mask 62 of the present embodiment is used. The symbol "N" refers to a value of L* when the well-known blue noise mask is used. In the respective case, the measurement value is shown depending on the shift amount of the dot formation positions (−10 pixels, −5 pixels, 0 pixel (no shift), 2 pixels, 5 pixels, 10 pixels, 20 pixels). In the right side of FIG. 7A, the change amount ΔL in the respective L* is shown. The change amount ΔL is the difference between the maximum value and the minimum value in each shift amount of the dot formation positions of L*.

Among the data shown in FIG. 7A, as a typical example of the values of P and N in a case of R=0, FIG. 7B is a graph showing plot as a shift amount of the dot formation positions in the horizontal axis. In a similar manner, each data shown in FIG. 7A can be a graph. As seen from FIG. 7B, it is understood that L* changes very little in the halftone processing used the dither mask 62 of the present embodiment although the dot formation positions during the forward action and the reverse action are shifted to the plus and minus directions from the position which is not shifted. The change amount ΔL is controlled in maximum of 0.3 (in a case of R=32, 64, 96). On the other hand, it is understood that L* changes significantly in the halftone processing used the well-known blue noise mask although the dot formation positions during the forward action and the reverse action are shifted to the plus and minus directions from the position which is not shifted in a case that the shift of the dot formation positions is occurred. The change amount ΔL is over 1.4 in the maximum (in a case of R=0). In general, when the change of L* is over 0.5 in a range, the difference can be confirmed visibly so that the change of the coverage should be controlled less than that range. By forming an image in the present embodiment, the change in the brightness is not detected even though the shift of the position between the dots formed during the forward action and the dots formed during the reverse action occurs.

In a similar manner, as shown in FIGS. 8A B, FIGS. 9A B, when an image is formed with magenta or yellow uniformly, the change of the range for the color space CIEL*a*B* is fully controlled as little. For example, as shown in FIG. 8A, in magenta (R=B=255, G=0, 32, 64, 96, 128), the change of the coverage is controlled to become that the change of L* in the present embodiment is within 0.4 in a range. On the other hand, when the blue noise mask is used, the change ΔL of L* becomes 1.5 in a maximum (in a case of G=32). Also, as shown in FIG. 8B, in yellow (R=G=255, B=0, 32, 64, 96, 128), in contrast with the present embodiment such that the change of the coverage is controlled to become that the change ΔL of L* is within 1.3 in the range, the case used the blue noise mask becomes 5.7 (in a case of B=64).

The change of images based on the change of the coverage is not limited to L* with respect to the brightness. As shown in FIGS. 9A and 9B, when the dither mask 62 is used in the present embodiment, in cyan (G=B=255, R=0, 32, 64, 96, 128), the change of the coverage is controlled not to exceed 0.6 in a range for the change Δa of a*. On the other hand, when the well-known blue noise mask is used, the change Δa of a* exceeds 1.6 in maximum (in a case of R=96). Also, in magenta (R=B=255, G=0, 32, 64, 96, 128), the change of the coverage is controlled not to exceed 0.4 in a range for the change Δb of b* in the present embodiment. On the other hand, when the blue noise mask is used, the change Δb of b* exceeds 1.6 in maximum (G=96). These changes of the color tone occur due to the different formation ratio in each color formation ink droplet. In the present embodiment, the printing is performed by the CMYLcLm ink droplets so that the color of images is changed by the ratio of each color formation ink droplet. As a result, if the change of the coverage by shifting the dot formation position is different in each color ink, the color tone is also changed. In the present embodiment, for the change of the coverage by shifting the dot formation position (difference of the dot distance), these changes of a*, b* are controlled in a predetermined range so that the user of the printer 20 does not feel as the change in the color tone. Specifically, one of the plurality of cases is a case that the printing is performed in the reference position where the position of the dots formed during the forward action and the position of the dots formed during the reverse action are fully adjusted, and another one is a case that the printing is performed when the position is shifted in a predetermined distance of the range between 2/720 inch to 5/720 inch from the reference position. Even in these cases, the changes of the brightness and the color tone are not recognized because the change of the L*a*b* color space is fully controlled as little.

As a result, although the shift of the dot formation position (the difference of the dot distance) during the forward action and the reverse action is occurred, by the halftone processing of the present embodiment, the change of the gradation in the formation images does not mostly occur. Also, the change of the color tone in accordance with the change of the coverage does not mostly occur. The change of the color tone in the first embodiment can be kept at least under the range which is visible by the user.

B. Dither Mask Generating Method

In the present embodiment, when the shift of the formation position of the dots formed during the forward and reverse action occurs, the change in the coverage is controlled to be in a predetermined range of the change in the CIEL*a*b* color space. In the present embodiment, the control for the change in the coverage is realized by controlling the paired dot incidence. In below, the principle of the control of the paired dot incidence is explained, and after that, the method for generating a dither mask controlled in the paired dot incidence is explained.

B-1. Principle of the Paired Dot Control

In the dot arrangement of the dot concentration form, the change in the coverage occurred when the dot formation position was shifted during the forward and reverse action has been already explained in FIG. 28. In a case of the dot concentration form, in general, the coverage tends to be increased in accordance with the shift of the dot formation position. In contrast with that, when the dither mask is used in the dot dispersion form, the coverage tends to be decreased in accordance with the shift of the dot formation position. Thus, when the blue noise mask is used as a typical form of the dither mask in the dot dispersion form, and the shift occurs in the dot formation positions during the forward action and the reverse action respectively, the brightness of images generally becomes high and the change of the shade occurs at the same time. In contrast, in the first embodiment, the change of the overlapping between the dots formed during the forward action and the dots formed during the reverse action when the dot formation position during the forward action and the reverse action is shifted in the predetermined range of the distance from 2/270 inch to 5/720 inch is controlled so that the change of the CIEL*a*b* space in the formed images becomes within the preliminary defined range. Besides this, there is an existence that the shift of the dot formation position can be occurred in each nozzle. For example, it can occur due to the shift of the formed position of the nozzle head, the shift in the landing positions of ink droplets by extending a printing medium, or the like.

Various methods can be thought as to have the above characteristics in the dither mask used in the halftone processing. In the first embodiment, to have the above characteristics in the dither mask 62, the paired dot control method is used as explained below. The paired dot means the relationship of both dots when the dots formed during the forward action (reverse action) and the dots formed during the reverse action (forward action) are arranged in the positions adjacent to each other. In the dither mask 62 of the first embodiment, the placement of the threshold is set to form a paired dot in a significant probability even in a low concentration region as described later. A significant probability forming a pared dot is a probability set in the following manner. In the dither mask 62 used in the first embodiment, the probability when the dots are placed in each pixel belonging to the first and second pixel groups in the range of 0 to $128/255$ in the gradation of the image data is k ($0 \le k \le 1$). In this manner, the probability K forming a dot in either one of a pixel adjacent to a dot formed pixel and formed rightward in the raster direction (main scanning direction) of the dot formed pixel or a pixel adjacent to a dot formed pixel and formed below the column direction (secondary scanning direction) of the dot formed pixel is approximately $0.8 \times k^2$.

Among the pixels adjacent to a reference pixel, the ones belonging to a different group in which dots are formed are referred to below as adjacent pixels. In the crossed arrangement shown in FIG. 3C, there are four pixels adjacent to the reference pixel on the left, right, top and bottom directions. When a significant discrepancy occurs in the dot formation position, it is between dots formed during the forward action and dots formed during the reverse action. Therefore, the dot occurrence probability is adjusted not simply with respect to dots being adjacent to each other, but with respect to dots from different pixel groups being adjacent to each other. In the first embodiment, the dots formed during forward action and the dots formed during reverse action are arranged in an alternating manner, as shown in FIG. 3C. Thus, pixels belonging to a different group are adjacent to a reference pixel in four locations: top, bottom, left, and right relative to the reference pixel. In this embodiment, only the pixel to the right of the reference pixel in the raster direction (main scanning direction) and the pixel underneath the reference pixel in the column direction (secondary scanning direction) are "adjacent pixels" of the reference pixel. This is because paired dots (dots formed in both adjacent pixels) can be counted using only one of two adjacent pixels symmetrical with respect to the reference pixel. In all of the pixels forming an image, the reference pixel moves successively from the top left to the bottom right of the image. When only one of two adjacent pixels symmetrical with respect to a reference pixel is counted, all of the paired dots can be counted without duplication.

Figure 10A:
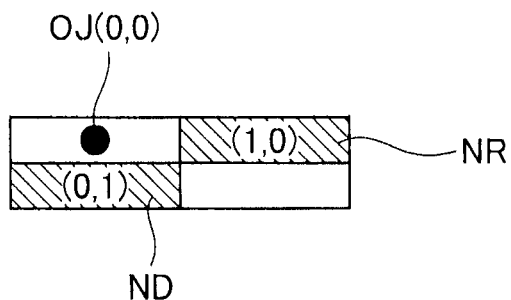
FIGS. 10A-C are descriptive diagrams showing adjacent pixels NR and ND in relation to reference pixel OJ.
Figure 10B:
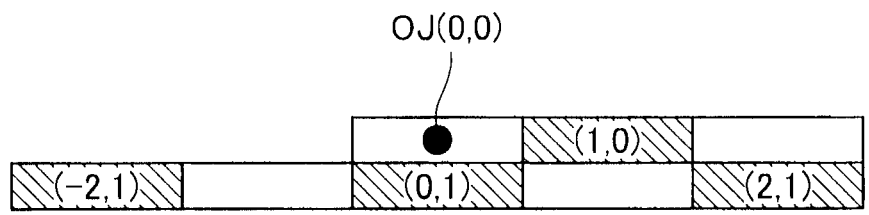
Figure 10C:
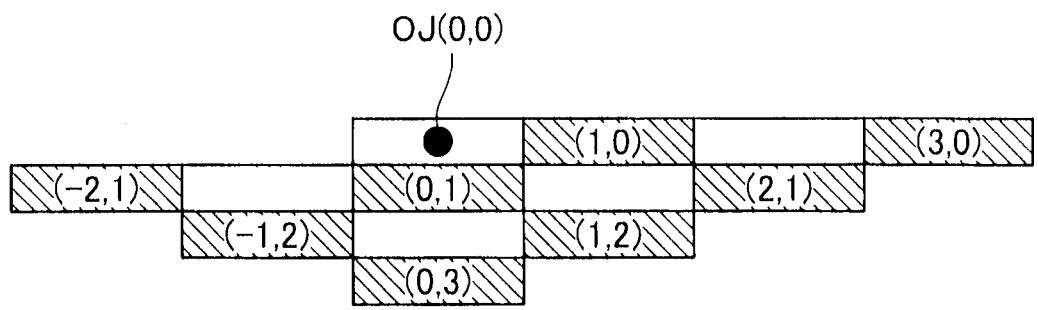

In FIG. 10A, the position of reference pixel OJ is (0,0). When there is positive movement in the main scanning direction and the secondary scanning direction, position (1,0) indicates adjacent pixel NR to the right, and position (0,1) indicates adjacent pixel ND below. In a case in which a relationship between the reference pixel OJ and either adjacent pixel NR or ND is identified, the combination is referred to as "paired pixels". In the first embodiment, as mentioned above, an adjacent pixel constituting paired pixels with the reference pixel is limited to the pixels NR, ND to the right or underneath the reference pixel OJ. However, this can be reversed and the counting of paired dots can be limited to pixels to the left of the reference pixel OJ and above. In FIG. 10A, paired pixels are limited to pixels adjacent to the reference pixel. However, pixels whose probability of occurrence is considered to constitute paired pixels do not have to be limited to adjacent pixels. As shown in FIGS. 10B and 10C, pixels in positions set apart from the reference pixel can be considered as adjacent pixels. In this case, another example will be described below.

The probability of dots being formed in paired pixels will now be described. Here, gradation values correspond to the probability of a dot being turned ON (formed). When a halftone-processed image ORG is an image with a uniform gradation value of 26/255, approximately one dot is placed for every ten pixels (k=0.1). In contrast, the probability K of dots being formed in paired pixels using the dither mask in the first embodiment is approximately $K=0.8 \times k^2 \approx 0.008$. In a well-known dither mask having high dispersion properties, the dispersion properties of dots in a low density region takes precedence. The probability of dots being formed in adjacent pixels or paired pixels that are adjacent is as close to zero as possible. When a dither mask having the known characteristics of a blue noise mask is used, no examples of dots formed in paired pixels at a gradation value of 26/255 have been found.

By contrast, in the first embodiment, the gradation values are 0-127/255. In other words, the probability K of dots being formed in paired pixels is approximately $0.8 \times k^2$ in a dot formation probability k in the range of approximately 0-0.5. For example, when the gradation value is 52/255 (k≈0.2), the probability K of dots being formed in paired pixels is 0.032. In other words, dots are formed at an approximate percentage of three groups per 100 groups of paired pixels.

Figure 11:
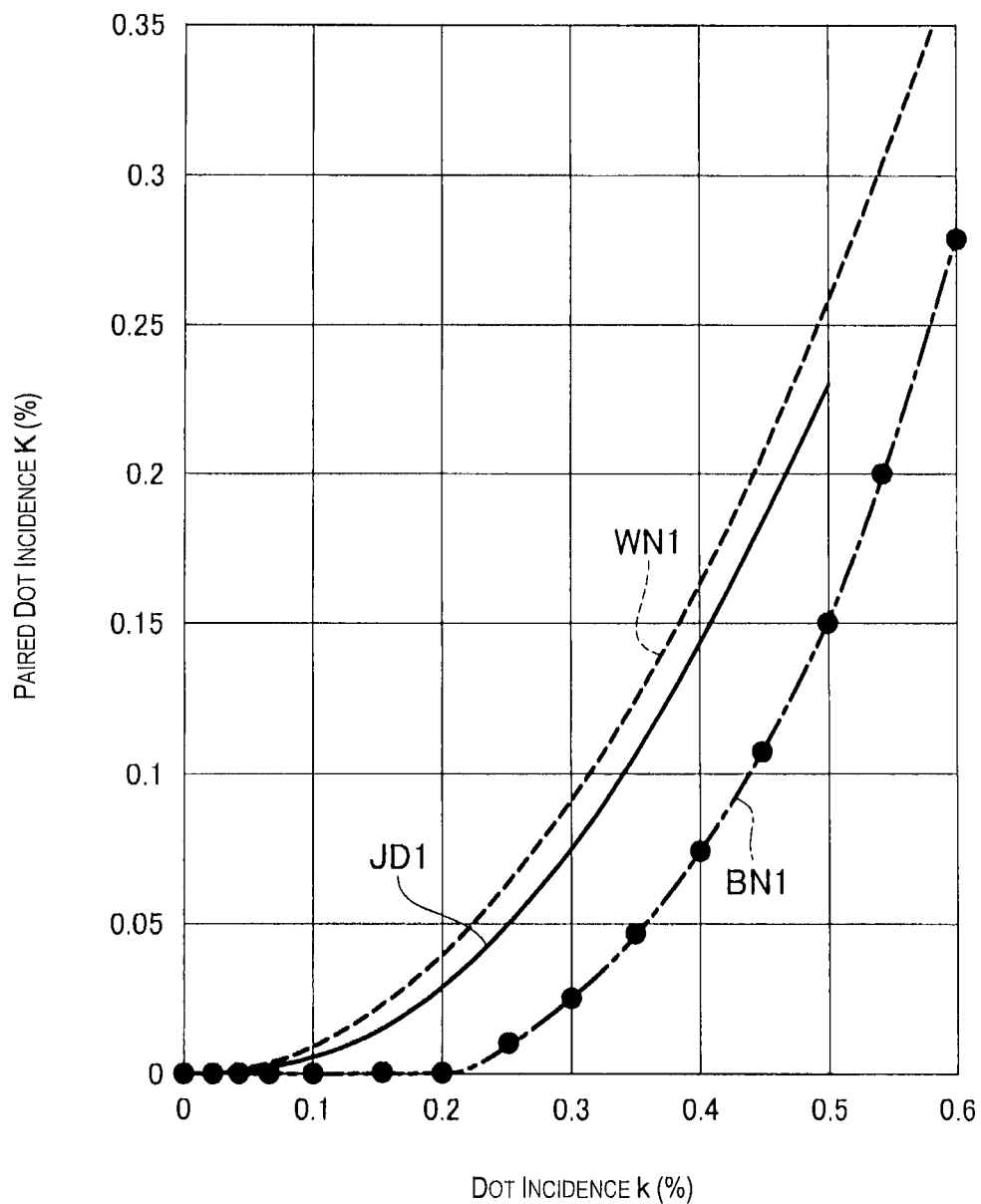
FIG. 11 is a graph showing a relationship between a dot incidence k and a paired dot incidence K.

The percentage of dots formed in paired pixels is illustrated schematically in FIG. 11. In FIG. 11, the horizontal axis indicates the probability of a dot being formed in a pixel, which corresponds to the gradation value of the image. In FIG. 11, the vertical axis indicates the percentage of dots formed in paired pixels. In FIG. 11, solid line JD1 indicates a case in which halftone processing was performed using the dither mask of the present embodiment, and dotted line BN1 indicates a case in which halftone processing was performed using a blue noise mask. Dashed line WN1 indicates a case in which halftone processing was performed using a white noise mask. Here, the white noise mask is a dither mask in which each threshold value was set using random numbers in a sufficiently large mask size to obtain results similar to the random dithering method in which the threshold value is generated each time using a random number. In contrast to a blue noise mask which has blue noise characteristics that do not contain any low-frequency components, a white noise mask has white noise characteristics that evenly contain everything from low-frequency components to high-frequency components.

When a blue noise mask is used as shown in the drawing, the probability of dots being formed in paired pixels is close to zero in a region having a low image gradation value (gradation value 0 to 51, dot occurrence probability k=0 to 0.2). By contrast, when a white noise mask is used, the formation position for dots is random. The probability of dots being formed in paired pixels closely matches $k^2$, where the probability of dot formation is k. While the dither mask employed in the present embodiment is a dispersion-type dither mask in contrast to these characteristics, the probability K of dots being formed in paired pixels is approximately $0.8 \times k^2$ in a gradation value range of 0 to 127 (dot occurrence probability k=0 to 0.5) as indicated by solid line JD1. In other words, the dither mask used in the present embodiment has dispersion properties close to those of a blue noise mask in the distribution of formed dots, but the probability K of dots being formed in paired pixels is close to that of a white noise mask. How a dispersion-type dither mask is created with an increased percentage of dot formation in paired pixels will be described below in further detail.

Figure 12:
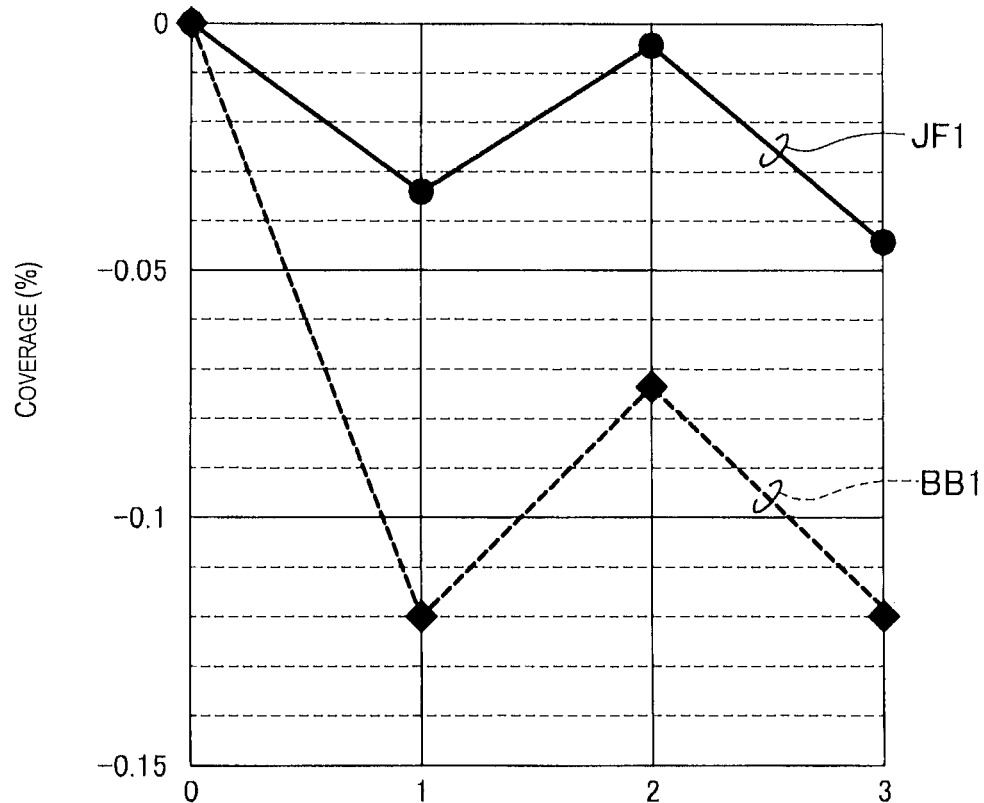
FIG. 12 is a graph showing an example of a change in coverage in a case in which there is a shift in dot formation positions at the forward action time and the reverse action time.

FIG. 12 is a graph showing simulation results for a change in coverage in a case in which image data ORG was processed with gradation values in which the percentage of dot formation was 96/255. In this figure, the horizontal axis indicates the shift in the formation position of dots during forward action and reverse action. Here, the units are pixels. The vertical axis indicates the change in coverage. In the graph shown in FIG. 12, the solid line JE1 indicates a case in which the dither mask 62 in the first embodiment is used, and dashed line BB1 indicates a case in which a typical blue noise mask is used. This mask was created so that dots are generated as discretely as possible. Here, coverage means the percentage of paper P covered by formed dots, and the change in coverage means the change in the percentage of paper P covered by overlapping dots caused by a shift in the formation position of dots relative to the percentage of paper covered by dots in the original case in which there is no shift in the formation position of dots.

In the printer 20, the dot size is set to be somewhat larger than the pixel size in order to entirely cover pixels by the ink droplets. As a result, even when dots overlap, dot overlapping occurs in which adjacent dots contact each other, and coverage is reduced. In a typical blue noise mask, the dispersion placement is such that the distance between dots is as far apart as possible. As a result, contact between pixels, the cause of coverage reduction, is minimized when there is no shift. Therefore, when a shift occurs in the formation position of dots during reciprocal printing with an actual printer 20, the formation position of dots shifts from the optimal placement, contact between dots and overlapping increase, and coverage is generally reduced. In a case where data of the same gradation value is printed, a change in coverage will result in variation in the concentration of the image as well as a drop in the image quality. Unevenness in image quality due to changes in coverage is more conspicuous in larger printed items printed by large printers. This is because larger printed items are generally viewed from a greater distance. When viewed from a greater distance, uneven printing at lower frequencies is more noticeable.

When the dither mask 62 in this embodiment is used, as shown in FIG. 12, it is evident that there is less change in coverage compared to a case in which an ordinary dispersion-type dither mask is used, even when there is a shift in the formation position of dots during forward action and reverse action. FIG. 12 shows the change observed when the amount of shift Δd in the printing position during reverse action relative to the printing position during forward action is greater when Δd is an odd number (i.e., 1, 3 . . . ) than when Δd is an even number (i.e., 2, 4 . . . ), where Δd is expressed in pixel units, and a period is a shift of 2. The reason for the change in a period of a shift of 2 is that the position of dots formed during forward action and the position of dots formed during reverse action completely overlap when the horizontal shift is an odd number during printing using crossed arrangement as shown in FIG. 3C. In a simulation in which a shift in the formation position of dots due to other factors was not taken into account, and printing was performed under the assumption that the shift in the formation position of all dots was the same during forward and reverse action, the reduction in coverage became apparent when the horizontal shift was an odd number, as shown in FIG. 12. In an actual printer 20, a small position shift in pixel units is superimposed on the shift in the formation position of dots during reciprocating printing. As a result, the change in coverage shown in FIG. 12 is made flat. In a case in which the dither mask 62 in this embodiment is used as indicated by the solid line JF1 in FIG. 12, the change in coverage is flat still, and hardly poses a problem. By contrast, the change in a case in which a dispersion-type dither mask is used as indicated by the dashed line BB1 in FIG. 12 is flat to some degree but not sufficiently eliminated, so that a change in coverage remains.

Figure 13:
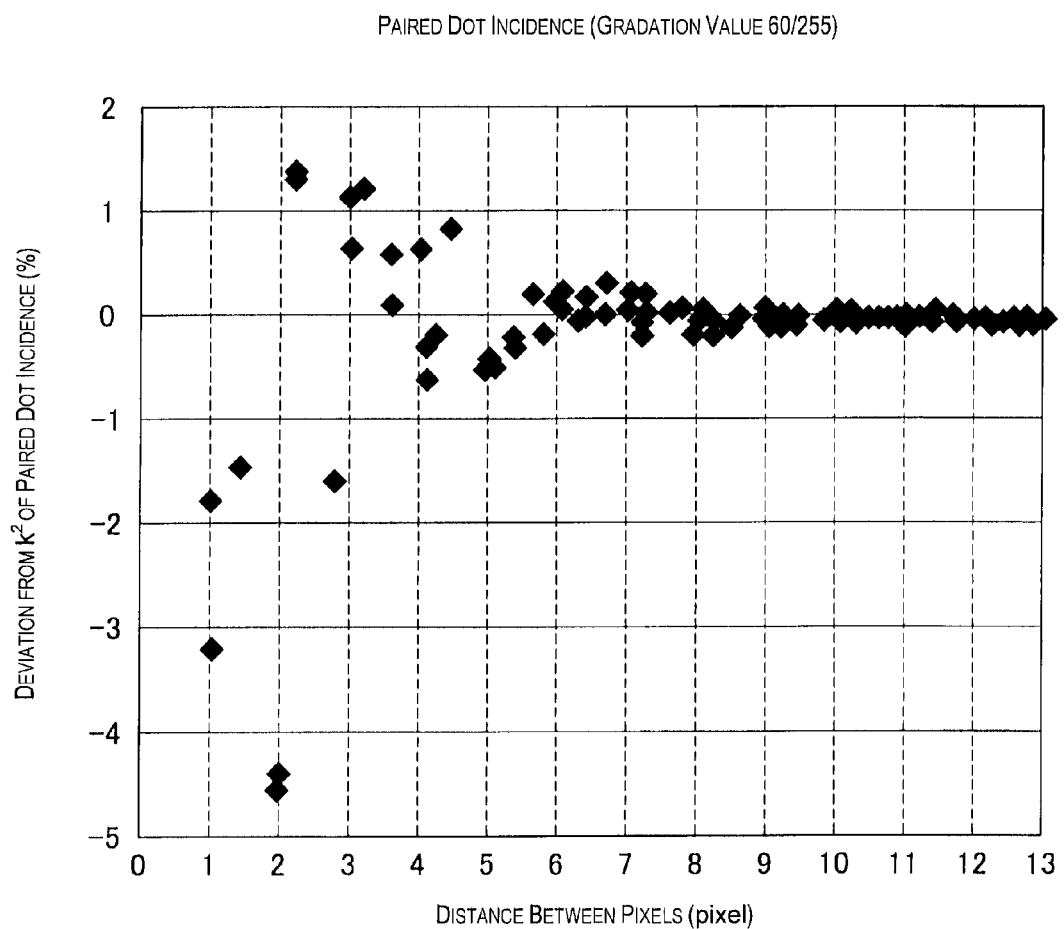
FIG. 13 is a graph showing the relationship between a shift amount in dot formation positions in pixel units and a deviation from the paired dot incidence $k^2$.

Setting the percentage of paired dot formation close to $k^2$ is based on the following new finding. When there is a shift in the formation position of dots in a certain pixel group and the shift is sufficiently large, it has been found that the probability of dots becoming adjacent to each other in a certain direction and becoming paired dots converges on $k^2$, even when the interval between dots is increased as much as possible through dispersed placement using a blue noise mask. Actual blue noise masks were studied and it was found, as shown in FIG. 13, that the probability of paired dots occurring converged on the constant value $k^2$ when the shift was from four to five or more pixels. This is because two pixels originally placed apart from one another became adjacent when the shift was large. Because the correlation for the presence or absence of dot formation for both pixels is reduced when the distance between two pixels is sufficient, the probability of dots being formed simultaneously in both pixels is $k^2$, which is obtained by simply multiplying the gradation values (dot formation probability k) of the two. Therefore, if the paired dot incidence in a situation with no shift is brought close to $k^2$ in advance, the paired dot incidence will not change very much no matter how much of a shift occurs, and any change in coverage can be suppressed.

In the above first embodiment, the probability K of dots being formed in paired pixels is $K=0.8 \times k^2$. Therefore, a reduction in the dispersion properties of the dot distribution in a case in which there is no shift in the formation position of dots can be suppressed. This coefficient adjusts the probability of paired dots occurring. When the coefficient is 0.8, it means the incidence of paired dots has been suppressed to 80%. The coefficient can be set anywhere within a range, for example, from 0.6 to 1.4. When the coefficient is set in a range from 0.8 to 1.2, a change in the probability of paired dots occurring relative to a shift in the formation position of the dots can be favorably suppressed. A coefficient closer to 1.0 is desirable from the standpoint of suppressing any change in the probability of paired dots occurring. When the dispersion properties of the dots in a low gradation region takes precedence, the coefficient can be adjusted to 0.8 or less, for example, from 0.6 to 0.8.

B-2. Dither Mask Generating Method

Figure 14:
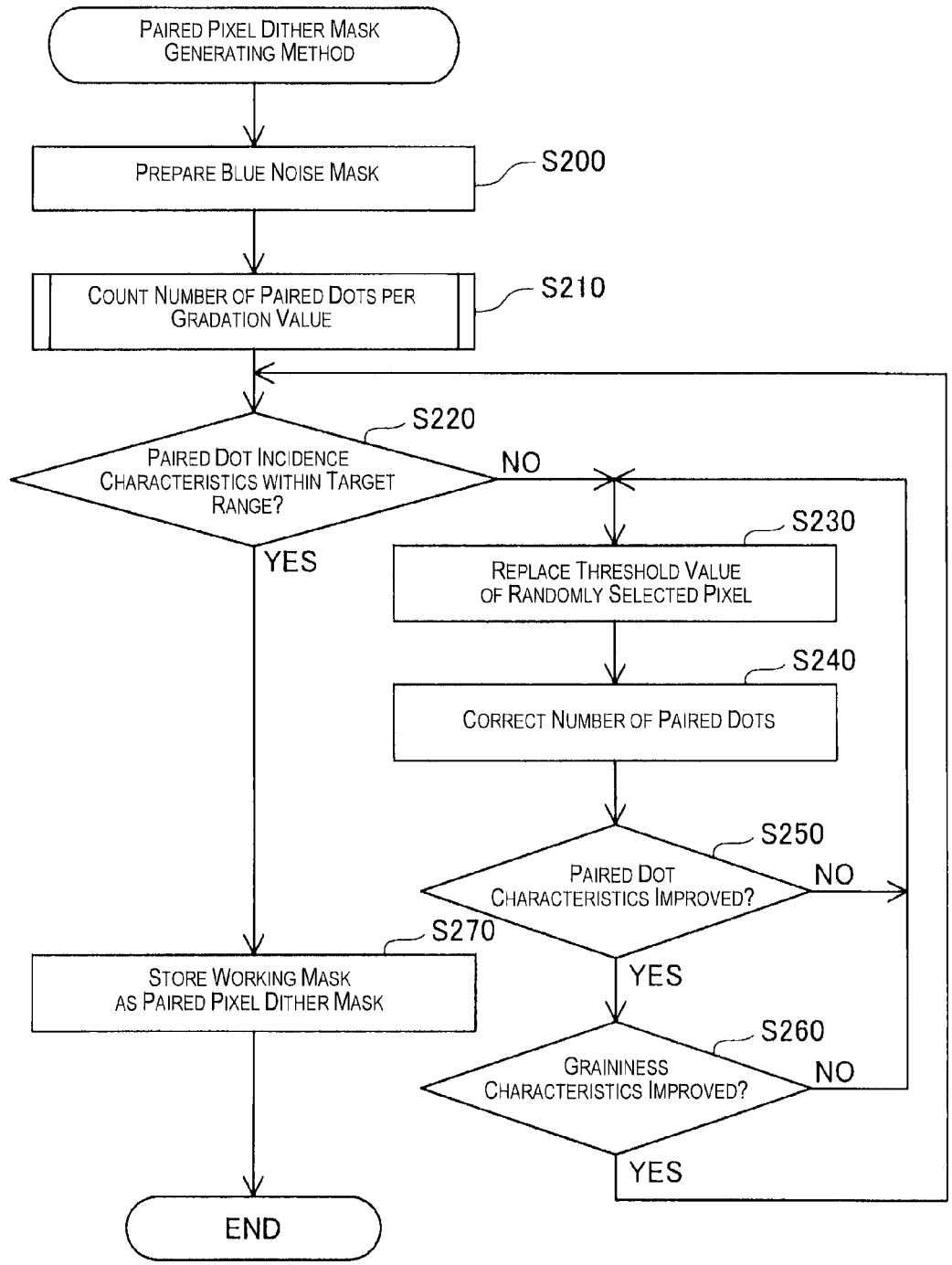
FIG. 14 is a flowchart showing the generating method for a paired pixel control mask.

The dither mask used in the first embodiment is generated using the following method. FIG. 14 is a flowchart showing an example of the generating method for the dither mask used in the first embodiment. In this embodiment, a blue noise mask is prepared, and a dither mask is generated from this blue noise mask in which the probability of dots being formed in paired pixels approaches $k^2$. The generated dither mask is called a "paired pixel control mask" below. While the mask is being generated, it is referred to as a "working mask".

When a paired pixel control mask is generated, a blue noise mask is first prepared (Step S200). In this example, a 64×64 blue noise mask is used. The blue noise mask in this example has 255 threshold values from 0 to 254 stored in a 64×64 matrix. Next, a process is performed on the working mask in which the number of paired dots per gradation value is counted in the entire gradation range (Step S210). More specifically, adjacent right paired dots RPD [1, 2, . . . 127] and adjacent underneath paired dots UPD [1, 2, . . . 127] are counted individually. In the following description, the use of parentheses such as (S) indicates the value for a gradation value S, and the use of brackets such as [a, x] indicates the sequence a-x in a gradation range. The sequence a-x in a gradation range is also expressed as [a:x].

Because all of the threshold values in the working mask are known, the formation position of dots for each gradation value can be examined in the gradation value 1-$^{127}/_{255}$ range. As a result, the number of adjacent right paired dots RPD (S) and adjacent underneath paired dots UPD (S) can be easily counted for each gradation value S. Here, the number of paired dots counted is limited to gradation values 1-$^{127}/_{255}$ because the paired pixel control mask used in the first embodiment, that is, a mask having predetermined characteristics for the probability of paired dots occurring in the 1-$^{127}/_{255}$ gradation range, is generated. When the gradation values S are larger, the number of paired dots approaches the attainment probability even in a blue noise mask. Therefore, instead of counting the number of adjacent paired dots in the entire range, the probability of paired dots occurring can be adjusted in the gradation value 1-$^{127}/_{255}$ range. However, the method described below can also be applied to a case in which the number of paired dots is counted in the entire gradation range to adjust the probability of occurrence.

After counting the number of adjacent right paired dots RPD[1:127] and the number of adjacent underneath paired dots UPD[1:127] in a predetermined gradation range (1-$^{127}/_{255}$ here) in Step S210, it is determined whether or not the number of paired dots for each gradation value S is within the target range M(S) (Step S220). Here, the target range M(S) is set in the following way. If the dither mask has white noise properties, dots are generated randomly. When the probability of a dot being formed in a pixel is k, the probability of a dot being formed in an adjacent right pixel or adjacent underneath pixel (the probability of paired dots occurring) is $k^2$ in both cases. When the gradation value of the image is 1, $k=0.00392156$ ($=1/255$), and the probability of paired dots being generated is $k^2=0.0000154$. Therefore, in a case in which it is assumed that dots are formed randomly, the value H predicting the presence of paired dots among 64×64 pixels (referred to as the prediction value below) is $H=k^2 \times 4096=0.063 \approx 0$. This calculation is repeated in advance in the 1-$^{127}/_{255}$ gradation value range to determine the theoretical prediction values for paired dots H[1:127], and this is multiplied by coefficient 0.8 to obtain the paired dot target values m[1:127] for each gradation value S. In this embodiment, the target value m(S) is given a ±20% range, and this is called the target range M(S).

FIG. 15 shows the paired dot prediction values H[1:32] and the target values m[1:32] for a case in which the gradation values S are 1-32. As shown in the drawing, it is understood that gradation value S=10 has prediction value H(10)=6 and target value m(10)=5, and gradation value S=20 has prediction value H(20)=25 and target value m(20)=20.

In Step 220, the theoretical paired dot target range M[1:127] determined in this manner is compared to the number of adjacent right paired dots RPD[1:127] and the number of adjacent underneath paired dots UPD[1:127]. In a case in which it is determined as a result of the comparison that the number of paired dots RPD[1:127] and URD[1:127] is not within the target range M[1:127], a process is performed in which the appropriate number of threshold values (for example, two threshold values) are randomly replaced among the threshold values in the working mask (Step S230). Since the threshold values are randomly replaced, then as long as threshold values corresponding to the same pixel group are replaced, replacing between different pixel groups can also take place.

Because threshold values in the working mask are replaced, the number of paired dots in each threshold value changes. Therefore, the number of paired dots is modified due to the replacement of threshold values (Step S240). Since the number of paired dots only changes within the gradation value range corresponding to the replaced threshold values, a recount is not performed in gradation range 1-$^{127}/_{255}$. Instead, the adjacent right paired dots RPD[p:q] and the adjacent underneath paired dots UPD[p:q] are recounted when, for example, threshold value p and threshold value q (p<q) have been replaced. While the replaced threshold values are selected randomly, the paired dot generating characteristics have to be adjusted in gradation value range 1-$^{127}/_{255}$. Therefore, at least one of the replaced threshold values should preferably be a threshold value within this range.

The number of paired dots recounted in this manner is examined, and it is determined whether or not the paired dot characteristics have been improved (Step S250). Here, whether or not the paired dot characteristics have been improved is determined in the following manner.

(A) An improvement is determined when, as a result of threshold value replacement, the number of adjacent right and underneath paired dots RPD[p:q], UPD[p:q] is closer to $k^2$.

(B) An improvement is determined when, as a result of threshold value replacement, either the number of adjacent right or underneath paired dots RPD[p:q], UPD[p:q] is closer to $k^2$ and the other number has remained unchanged.

(C) An improvement is determined when, in a case in which there is some improvement and some deterioration in gradation range [p:q], the sum of the difference between the number of paired dots generated by each gradation value in the gradation range and the prediction value for each gradation value is smaller.

In a case in which this determination is performed and it is determined that there has been no improvement in the paired dot characteristics, the process returns to Step S230, and the process is executed again beginning with the random replacement of threshold values. When two threshold values are replaced in the threshold value replacement process, the number of combinations within the entire gradation range is $_{4096}C_2$. The number is $_{2048}C_2$ when the range is limited to the gradation range 1-$^{127}/_{255}$. Therefore, while there is a considerable number of possible threshold value replacement combinations and a considerable amount of time is required to exhaust all possibilities, a replacement combination which improves the paired dot characteristics will be found when this process is performed successively (YES in Step S250).

Figure 16:
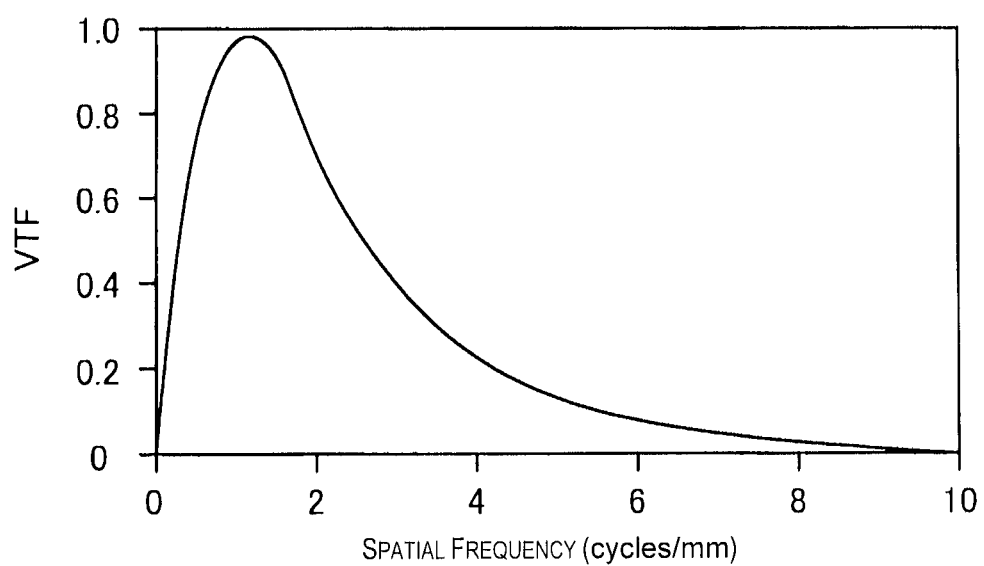
FIG. 16 is 1 descriptive diagram showing an example of Visual Transfer Function (VTF) sensitivity characteristics.

When it has been determined that the paired dot characteristics have been improved, it is then determined whether or not there is any problem with graininess (Step S260). Here, no problems with graininess means the graininess index shown below is within the target range, or the index is not within the target range but there has been an improvement since threshold value replacement. Since the graininess index is well known in the art (see, for example, Japanese Laid-open Patent Publication No. 2007-15359), a detailed description has been omitted. However, this is an index obtained by performing a Fourier transform on an image to determine the power spectrum FS, weighting the resulting power spectrum FS corresponding to the visual transfer function (VTF) or sensitivity characteristics relative to the spatial frequencies visible to humans, and integrating this at each spatial frequency. A VTF example is shown in FIG. 16. Various equations have been proposed as experimental equations for providing this VTF. A typical experimental equation is shown in Equation (1). Variable L is the observation distance, and variable u is the spatial frequency. The graininess index can be calculated using the calculation equation shown in Equation (2) on the basis of the VTF. Coefficient τ is a coefficient for combining the resulting value with human vision. From the calculation method, it is clear that the graininess index can be said to indicate whether or not dots seem to stand out to humans. A lower graininess index is superior from the standpoint of print quality because it means the dots are less visible.

[Equation 1]

$$VTF(u) = 5.05\exp\left[\frac{-0.138\pi Lu}{180}\right]\left\{1 - \exp\left[\frac{-0.1\pi Lu}{180}\right]\right\} \quad (1)$$

[Equation 2]

$$\text{Graininess Index} = \kappa \int FS(u) \cdot VTF(u) du \quad (2)$$

The blue noise mask prepared initially is configured so that the graininess index has the lowest value. However, when threshold values are randomly replaced in Step S230, the graininess of the working mask is worse than the blue noise mask. Therefore, a target range is provided for the graininess index, which is the acceptable range based on characteristics of human vision. This range is used to determine whether or not there are any problems. Since the graininess index is a value determined for each gradation value, an upper limit is prepared for each gradation value. When the graininess index for each gradation value is below the upper limit, the graininess can be determined to be within the target range.

In a case in which there is a problem with graininess, that is, the graininess is not within the target range, and it has been determined that there has been no improvement compared to the situation before the threshold values were replaced (NO in Step S260), the process returns to Step S230 and is repeated beginning with the replacement of threshold values. When, as a result of repeating the process from Step S230 to Step S260, it has been determined that the paired dot characteristics are improved and that there is no problem with graininess (YES in both Step S250 and Step S260), the loop from Step S230 to Step S260 is exited, the process returns to Step S220, and it is determined whether or not the paired dot generation characteristics are within the target range.

When it cannot be determined whether the paired dot generation characteristics are within the target range (NO in Step S220), the process is repeated beginning with the above Step S230. In the process shown in FIG. 14, Step S220 through Step S260 are repeated by replacing the threshold values until the conditions have been satisfied. When the number of times the process from Step S230 to Step S260 being performed (referred to below as the number of loops) is small, another acceptable process involves increasing the upper limit for the graininess in Step 260, and bringing the upper limit close to the final target value as the number of loops increases. By changing the upper limit depending on the number of loops performed, the graininess index can be prevented from dropping to the local minimum value.

When the loop from Step S230 to Step S260 has been performed several times, and it has finally been determined that there are no problems with graininess and that the adjacent right paired dots RPD[1:127] and the adjacent underneath paired dots UPD[1:127] are within the target range M[1:127] (YES in Step S220), the paired pixel control mask has been completed. At this time, the working mask is saved as the paired dot control mask (Step S270), the process is exited at END, and the paired dot control mask generating routine (FIG. 14) is ended. In this description, it was determined whether or not the paired dot generating characteristics are within the target range using the 1-$^{127}$/$_{255}$ range within the entire gradation value range in which paired dots can be generated. However, any gradation range can be used by the paired dot control mask to control the probability of paired dots occurring. For example, the range can be limited to the low density range (the gradation range corresponding to a dot generation probability of k=0 to 0.25, 0.2 to 0.5 or the like).

A paired pixel control mask can be obtained on the basis of a blue noise mask using the method described above. In the first embodiment, the dither mask is a dither mask used to determine dot formation. Since the paired pixel control mask is based on a blue noise mask, it hardly possesses any components in the low-frequency range to which humans have high visual sensitivity when the distribution of dots formed in the image in the low gradation value range is analyzed in terms of spatial frequencies. As a result, a dither mask can be provided which is able to realize high picture quality. In addition, using this paired pixel control mask, the probability of paired dots occurring in adjacent pixels is approximately $k^2 \times 0.8$, where k is the probability of a dot being formed at each gradation value. As a result, even though there is a shift in the formation position of dots during forward action and reverse action, the change in the coverage is suppressed and the change in the CIEL*a*b* color space caused by a shift in the formation position of dots can be suppressed as follows.

(A) When the printed image is yellow (RGB value: R=G=255, B=0 to 64, when RGB value is 8 bit conversion), the change of b* is less than value 2 in the range.

(B) When the printed image is magenta (RGB value: R=B=255, G=0 to 64, when RGB value is 8 bit conversion), the change of L* is less than value 0.5 or the change of a* is less than value 0.5 in the range.

(C) When the printed image is cyan (RGB value: G=B=255, R=0 to 64, when RGB value is 8 bit conversion), the change of L* is less than value 0.5 in the range.

It is not required to satisfy all of the conditions, but at least one of the conditions should be satisfied.

As a result, the dither mask which can suppress the occurrence of the uneven in the image is provided. When the dither mask provided in accordance with FIG. 14 does not satisfy the above conditions, the target value of the coverage, that is, the coefficient value of $k^2$ such multiplication (0.8 in the above example), is changed until obtaining the intended characteristics so as to repeat the processing in FIG. 14.

In this embodiment, the paired pixel control mask was generated beginning with a blue noise mask. However, it can also be generated from a dither mask having other characteristics. As mentioned above, the time required to generate a mask can be reduced if the dispersion properties are superior and the original dispersion properties are close to the characteristics to be converged upon, such as in a blue noise mask or a green noise mask. When a dither mask is generated from one of these, a paired pixel control mask can be generated by applying the following rules.

(1) The threshold values are placed in a matrix in successive order from either the small side or the large side.

(2) When the next threshold value is placed relative to a threshold value already placed in a certain position, the placement position for the next threshold value is associated with the evaluation value for the situation using an evaluation value such as the graininess index. In addition, the candidate placement position for the next threshold value is identified in successive order from the highest evaluation.

(3) The candidates are taken out in successive order from the highest evaluation, and the number of paired dots in this situation is counted. When a candidate is found for the required number of paired dots (for example, the number shown in FIG. 15), the next threshold value is placed in this location.

(4) Rules (1) through (3) are repeated until the threshold values are exhausted.

The placement of threshold values can be decided from one, and a paired pixel control mask generated using these rules.

C. Modification Examples of First Embodiment

Modification examples of the first embodiment described above will now be described. In the first embodiment, the formation position of the dots alternated between the main scanning direction and the secondary scanning direction during forward action and reverse action, and the positions of the adjacent pixels constituting paired pixels, as shown in FIG. 10A, were two pixels, one to the right in the main scanning direction and another underneath in the secondary scanning direction. However, adjacent pixels are not limited to these two. These adjacent pixels can be to the right and to the left in the raster underneath in the secondary scanning direction. When the position of the reference pixel OJ is (0,0), a total of four groups of paired dots are counted in which the adjacent pixels are the pixels at the (1,0) and (0,1) positions, and the adjacent pixels are the pixels at the (−2,1) and (2,1) positions. This is shown in FIG. 10B. The range can be expanded further and enlarged to eight pixels as shown in FIG. 10C. If the paired pixel range is expanded, the occurrence of density unevenness can be suppressed even when there is a shift in the formation position of dots. It is desirable to expand the range of adjacent pixels in a direction in which a shift in the formation position of dots does not occur during printing. As shown in FIG. 10B, setting the adjacent pixels broadly in the main scanning direction is effective at suppressing density caused by a shift in the main scanning direction.

Figure 3A:
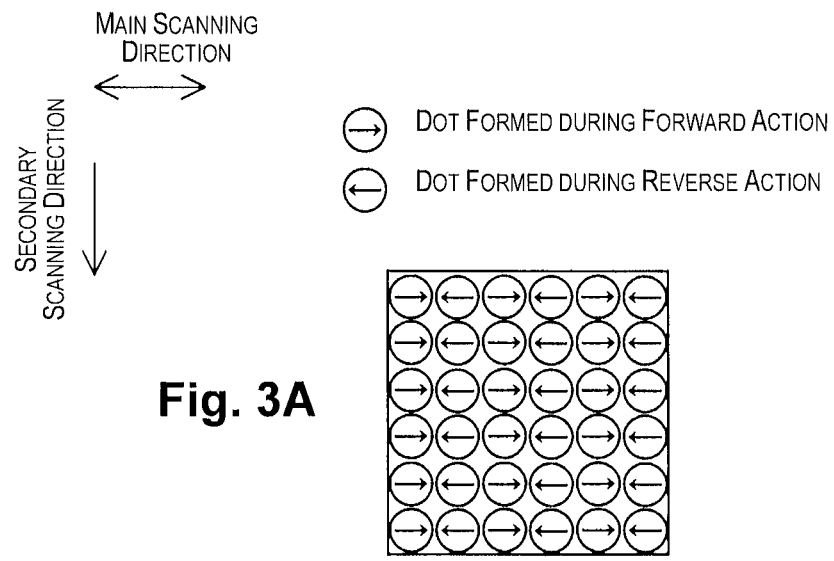
FIGS. 3A-C are descriptive diagrams showing variations in which the dots formed during forward action and the dots formed during reverse action are combined.
Figure 3B:
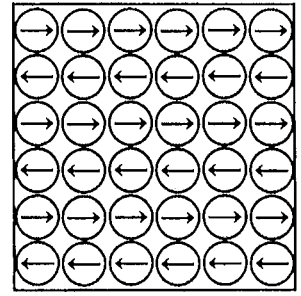
Figure 3C:
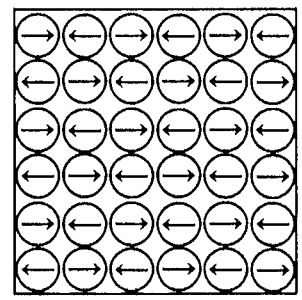

Dots formed during forward action and dots formed during reverse action can alternate by column as shown in FIG. 3A or alternate by raster as shown in FIG. 3B. Even in this case, the adjacent pixel range can be set in many different ways.

In order to simplify the description of the embodiment and modification examples, the resolution of the gradation values in the image was set at 8 bits, and the range of the threshold values was set at 0-255. If the threshold values placed in the dither mask are set at 0-4095, and the number of bits expressing the gradation values in the image is increased, for example, to 10 bits, the number of dots placed with respect to the smallest gradation value 1 can be reduced, and the number of dots increased with each increase of 1 in the gradation value can be reduced. As a result, the control of the probability of paired dots occurring can be performed more precisely. When the size of the dither mask is increased to 128×128 or 256×512, the number of dots formed in a case in which the gradation value expressed using 10 bits is 1 becomes four in the case of the former and 32 in the case of the later. The size of the dither mask, the number of bits expressing the gradation values, and the type of threshold value placed in the dither mask can be decided by taking into account the purpose of the halftone processing to be executed (image quality takes precedence, processing speed takes precedence, whether or not large format printing is to be performed, and the like) or the processing time.

In the first embodiment, a paired pixel control mask was prepared in which paired dot control was performed using a gradation value range of 0-$^{127}$/$_{255}$. In other words, paired dot control was performed so the probability k of dots occurring was within the range 0<k<0.5. However, the upper limit can also be limited on the low gradation value side. For example, paired dot control can be performed in a range limited to 0<k<0.2. Since the likelihood of dot overlap occurring due to a shift increases as the size of the dots increases relative to the size of the pixels, a gradation range in which density fluctuation becomes a problem is moved to a lower density. Therefore, it is realistic to change the adjusted range in accordance with the actual size of the dots relative to the pixel size. Also, the lower limit can be limited on the high gradation value side. Generally, the problem of density unevenness is not prominently manifested in the low gradation range near a gradation value of zero, even when the original dot formation positions are far apart and a shift in the formation position of dots occurs. Therefore, a paired pixel control mask can be generated in which the range is limited to 0.1<k<0.4 or 0.2<k<0.5. Also, the percentage of dots formed during forward action and the percentage of dots formed during reverse action is changed from the initial percentages. Here, different dot formation probabilities k1, k$^2$ can be set for them when paired dot control is performed.

D. Second Embodiment

D-1. Dither Mask

Next, the following is a description of the second embodiment of the invention. The hardware of the printer 20 in the second embodiment is the same as that of the first embodiment (see FIG. 1). Also, the print control process for the printer 20 (FIG. 4) is also the same except that a different dither mask is used in the halftone processing. The halftone processing in the second embodiment also uses the so-called dither method.

The following is a list of the similarities and differences between the dither mask used in the second embodiment and the dither mask used in the first embodiment.

(1) Similarities in Both:

The size of the dither mask is 64×64 in both.

A dispersion-type dither mask is used in both which gives priority to the dispersion properties.

When there is a shift in the formation position of dots during forward action and reverse action, the change in the CIEL*a*b* color space satisfies the following (A) to (C) conditions in both.

(A) When the printed image is yellow (RGB value: R=G=255, B=0 to 64, when RGB value is 8 bit conversion), the change of b* is less than value 2 in the range.

(B) When the printed image is magenta (RGB value: R=B=255, G=0 to 64, when RGB value is 8 bit conversion), the change of L* is less than value 0.5 or the change of a* is less than value 0.5 in the range. (C) When the printed image is cyan (RGB value: G=B=255, R=0 to 64, when RGB value is 8 bit conversion), the change of L* is less than value 0.5 in the range.

(2) Differences in Both:

Once, the temporary dither mask 61 (not shown in the drawing) which is excellent for the dispersion properties is generated, and the dither mask 62 is generated by shifting the temporary dither mask 61. In the first embodiment, the threshold values for the 64×64 dither mask were created to take into account only the dispersion properties of the dot dispersion formed during forward action and reverse action of the print head 90. By contrast, the temporary dither mask 61 in the second embodiment is created to take into account the dispersion properties of dots in the first pixel group to which the dots formed during forward action of the print head 90 belong and the dots in the second pixel group to which the dots formed during reverse action of the print head 90 belong.

In the second embodiment, the dither mask 62 satisfies the above (A) to (C) conditions so that when the position of the dots formed during the forward action of the print head 90 and the position of the dots formed during the reverse action are shifted, the large change in the coverage does not occur and the change in the CIEL*a*b* in an image is fully suppressed. Thus, it provides the same effect as the first embodiment. In particular, there is a case in which the printing is performed in the reference position where the position of the dots formed during the forward action and the position of the dots formed during the reverse action are fully adjusted. Also, there is a case in which the printing is performed in a position shifted in the predetermined distance range of $^2$/$_{720}$ to $^5$/$_{720}$ inches from the reference position. Even comparing these cases, the change in L*a*b* color space is fully suppressed in a small range and the change in the brightness or the color tone is not recognized.

D-2. The Generation Method of the Temporary Dither Mask 61 and the Dither Mask 62 for Actual Use The generation method of the above temporary dither mask 61 and the dither mask 62 for actual use is discussed. The temporary dither mask 61 and the dither mask 62 for actual use have storage elements corresponding to the size (number of the threshold values). In the present embodiment, the size of the temporary dither mask 61 and the dither mask 62 are the same. The storage elements are the elements to store the threshold values constituting the temporary dither mask 61 and the dither mask 62 for actual use. The threshold value is stored one by one in all the storage elements so as to generate the temporary dither mask 61 and the dither mask 62 for actual use. The temporary dither mask 61 is the dither mask to be generated in a mid-step of the generation processing for the dither mask 62. The generation method described below is the process for generating the temporary dither mask 61 and the dither mask 62 for actual use in the mainframe of the CPU or the like. Also, it can be possible that a part or all of the processes explained below is performed by the user's hand calculation or the like. Also, the temporary dither mask 61 is used for generating the dither mask 62 so that it does not need to be stored in EEPROM 60 of the printer 20. The temporary dither mask 61 is usually stored in the memory of the inside dither mask generation device (computer).

The sizes of the temporary dither mask 61 and the dither mask 62 for actual use can be, for example, 256 pixels×256 pixels, 512 pixels×512 pixels, or the like. In the below explanation, for the explanation to be simplified, the sizes of the temporary dither mask 61 and the dither mask 62 for actual use are explained by 5 pixels in both the size in the vertical direction and the size in the horizontal direction, that is, the size applied for the image size of total 25 pixels (=5×5).

Figure 17:
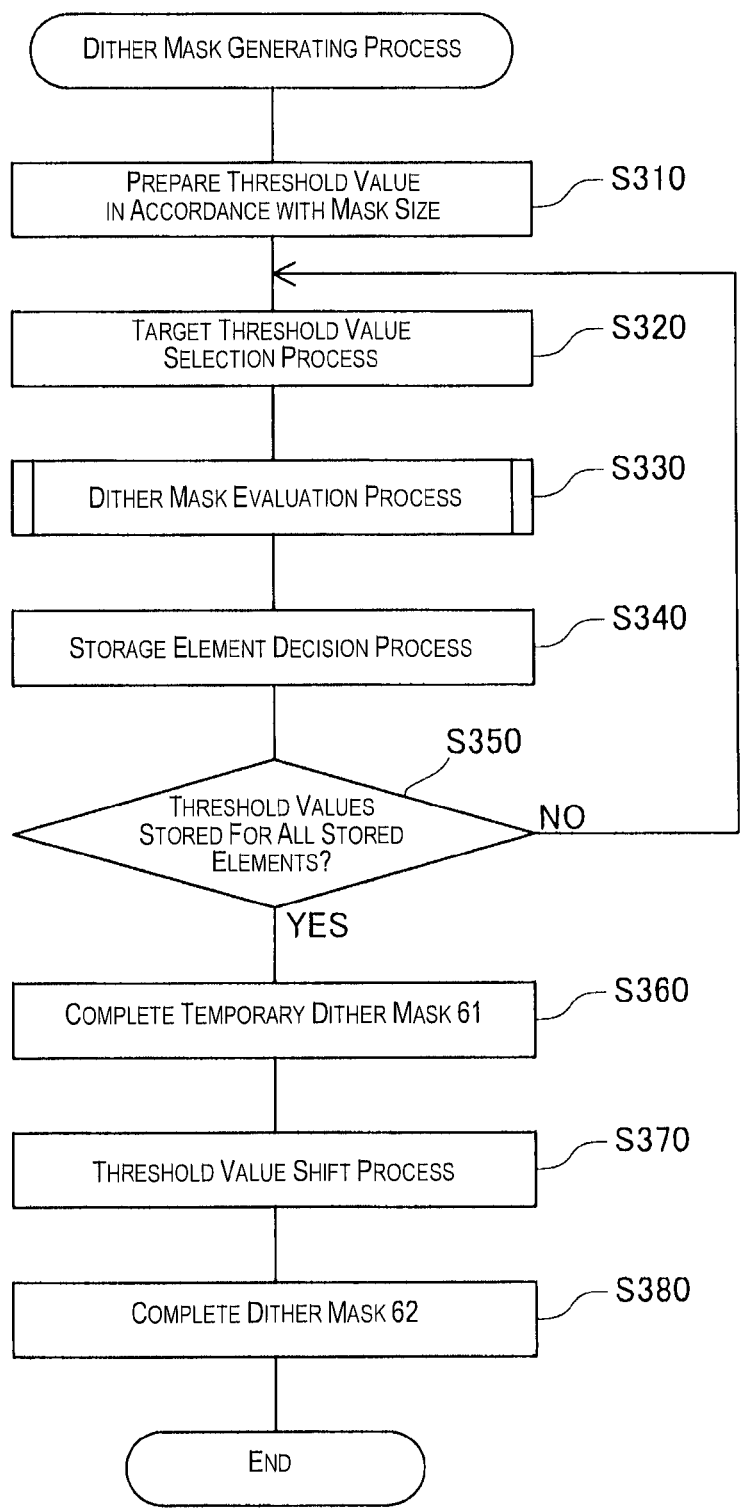
FIG. 17 is a process chart showing the flow of the method for generating a temporary dither mask 61 used for the halftone process of the printer 20, and generating a dither mask 62 for actual use.

FIG. 17 is a process chart showing the steps of the generation method for the temporary dither mask 61 and the dither mask 62 for actual use. In the generation of the temporary dither mask 61 and the dither mask 62 for actual use, as shown in the drawing, the threshold values with respect to the sizes of the dither mask 61 and the dither mask 62 for actual use are prepared (Step 310). In the present embodiment, the temporary dither mask 62 and the dither mask 62 for actual use have 25 storage elements so that the threshold values 0 to 24 with a corresponding number of these elements are prepared.

Figure 19:
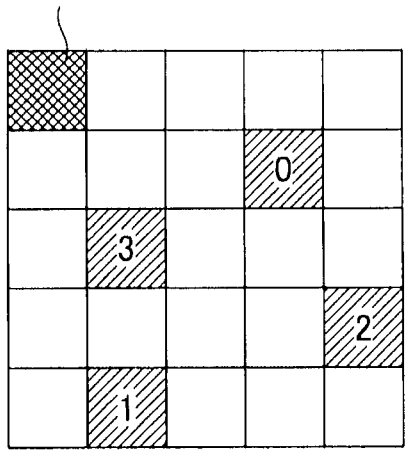
FIG. 19 is a descriptive diagram showing a status or the like in which the threshold value is stored in a part of stored elements of the temporary dither mask 61 and the dither mask 62 for actual use.

When the threshold values have been prepared, the target threshold value selection process is performed (Step S320). In the target threshold value selection process, a threshold value is selected as a target threshold value among the prepared threshold values 0-24 not yet stored in a storage element. In this embodiment, the target threshold values are selected from among the prepared threshold values in successive order from the smallest to the largest. As shown in FIG. 19, in a case in which threshold values 0-3 have already been stored in storage elements constituting the temporary dither mask 61 and the dither mask 62 for actual use by performing the steps described below, the target threshold value selected in the next Step S320 is value 4.

When the target threshold values have been selected, the dither mask evaluation process is performed (Step S330). In the dither mask evaluation process, in a case in which a target threshold value is to be stored in a storage element that is not yet storing a prepared threshold value (referred to below as an empty storage element), an evaluation value E is calculated for each empty storage element which indicates the extent of dot dispersion in a dot formation pattern indicating the arrangement of storage elements in which threshold values have already been stored (referred to below as decided storage elements).

In the present embodiment, a smaller evaluation value E indicates better dot dispersion properties and is good from the standpoint of the graininess of the printed image. In the halftone processing, the dot is turned ON in a pixel in which the threshold values of the temporary dither mask 61 and the dither mask for actual use are smaller than the inputted gradation value. Thus, when the gradation value of all pixels inputs the same solid image and the applied gradation value gradually increases, it appears the formation pattern of the dots with respect to the arrangement of the threshold value in the temporary dither mask 61 and the dither mask for actual use. In the present embodiment, the dot form based on these dot incidence properties is called the dot formation pattern.

Figure 18:
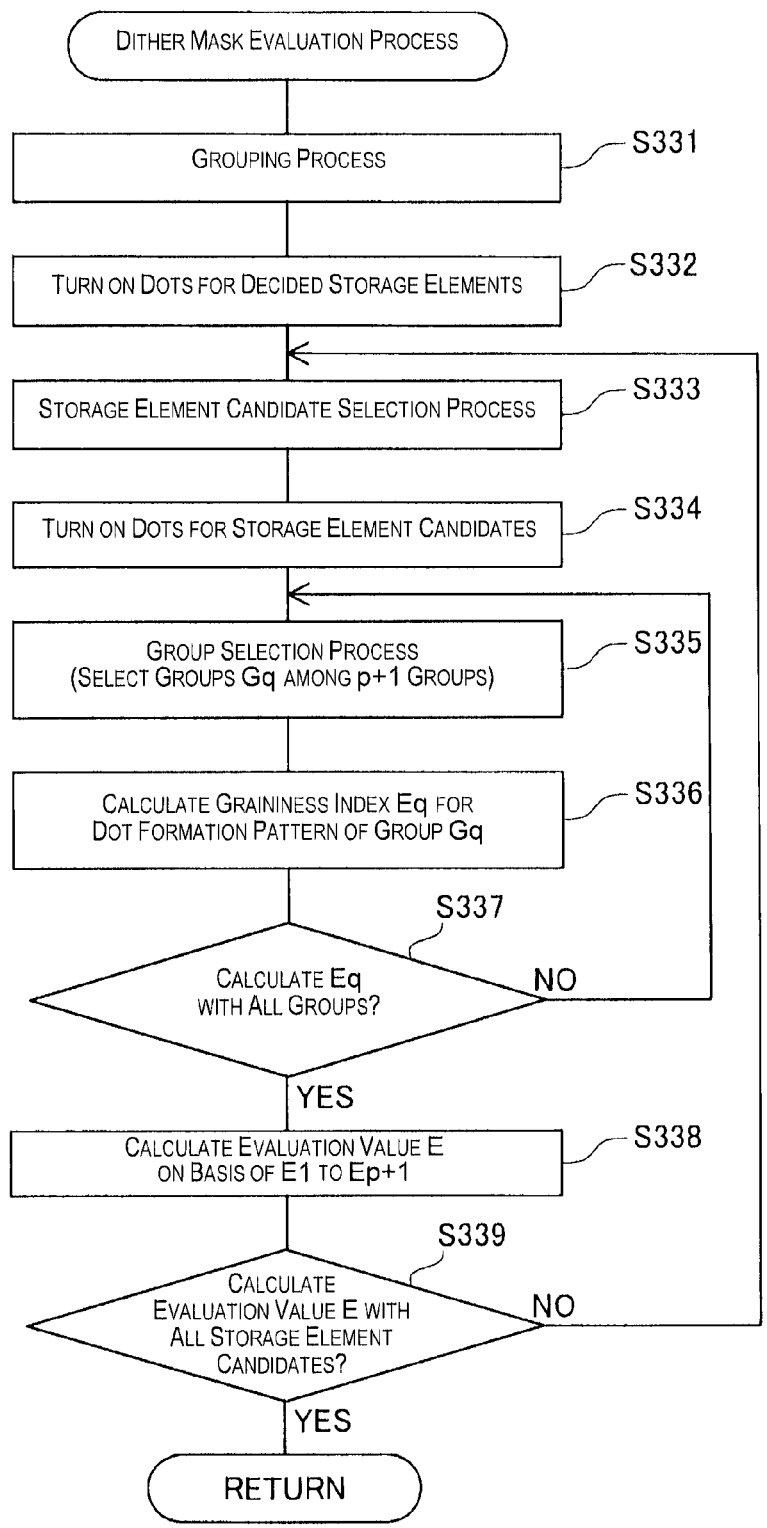
FIG. 18 is a process chart showing the flow of the dither mask evaluation process for the generating method of the temporary dither mask 61 and the dither mask 62 for actual use.

Using FIG. 18 the following is a description of the dither mask evaluation process. In the dither mask evaluation process, a grouping process is performed first as shown in FIG. 18 (Step S331). In the grouping process, the plurality of storage elements constituting the temporary dither mask 61 and the dither mask 62 for actual use are divided into a plurality of groups, focusing on whether the threshold values stored in the plurality of storage elements form dots in the dot formation positions applied in the halftone processing during forward action or reverse action. In other words, groups of storage elements are set on the basis of the placement mode for dots formed during forward action and dots formed during reverse action. For example, when the column mode is employed for the dot placement mode, the groups are divided into a pattern which is the same pattern as shown in the pixel group during the forward action and the pixel group during the reverse action shown in FIG. 3A.

When the grouping process has been performed, the dots in the decided storage elements are turned ON (Step S332). In FIG. 19, the single hatching indicates the dots in the decided storage elements which are storing threshold values 0-3 and which have been turned ON. When the dots in the decided storage elements have been turned ON, the storage element candidate selection process is performed (Step S333). In the storage element candidate selection process, storage elements that are candidates for storing the target threshold value are selected. Since a target threshold value can be stored in each of the empty storage elements, one of the empty storage elements is selected as a storage element candidate. When the storage element candidate selection process has been performed, the dot in the storage element candidate is turned ON (Step S334). In FIG. 19, the cross-hatching indicates the selection of one of the empty storage elements as the storage element candidate and the turning ON of the dot for that storage element candidate.

When the dot for the storage element candidate has been turned ON, the group selection process is performed (Step S335). In the group selection process, a group Gq (where q is an integer from 1 to p+1) is selected from among p groups G1-Gp set in the above Step S331 (p is an integer equal to or greater than 2, and here p=2) and a group Gp+1 which is a group including all of the storage elements constituting the temporary dither mask 61 and the dither mask 62 for actual use.

Figure 20:
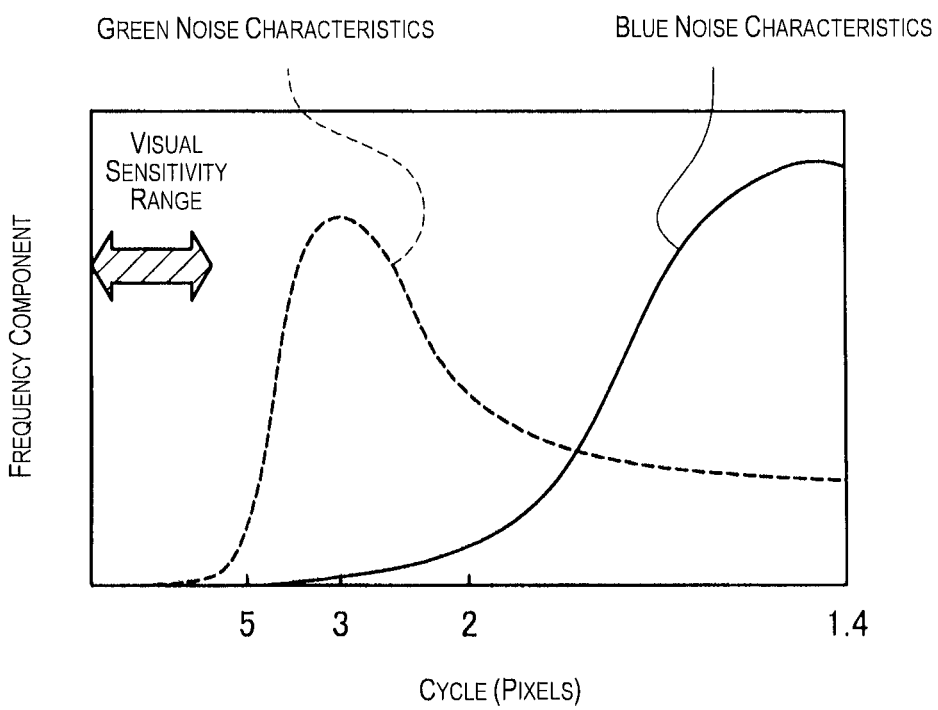
FIG. 20 is a descriptive diagram showing blue noise characteristics and green noise characteristics.

When group Gq has been selected, evaluation value Eq indicating the degree of dot dispersion is calculated on the basis of the dot formation pattern corresponding to the storage elements belonging to group Gq. In other words, an evaluation value indicating the degree to which the dots are dispersed evenly is calculated (Step S336). As is well known, a dither mask can be generated with blue noise characteristics as shown in FIG. 20 in order to form dots that are dispersed evenly. In blue noise characteristics, the distribution of dots formed has a noise characteristic possessing a peak in the spatial frequency region on the higher-frequency side. In the characteristics of the human vision, since the sensitivity at high frequency more than 10 cycle/mm in a case of the observation distance 30 cm is almost zero, the excellent dither mask can be generated in more than that region possessing a peak. In the present embodiment, the graininess index described in the first embodiment is used as the evaluation value indicating the degree to which the dots are dispersed evenly, in order to generate a dither mask with these characteristics (see FIG. 16 and Equations (1) and (2)).

When the evaluation value Eq has been calculated, the above Step S335 and Step S336 are repeated until an evaluation value Eq has been calculated for all of the groups G1-Gp+1 (here, G1-G3) (Step S337). When evaluation values Eq (E1-E3) have been calculated for all groups G1-G3 (YES in Step S337), an evaluation value E is calculated on the basis of the calculated evaluation values E1-E3 using Equation (3) (Step S338). In Equation (3), a-c are weighting factors. These weighting factors have been determined experimentally as constants so as to obtain good print quality. In other words, evaluation value E is a weighted overall evaluation value for the degree of dot dispersion in the dot formation pattern indicated by all of the decided storage elements in the temporary dither mask 61 and the dither mask 62 for actual use, the dot formation pattern indicated by the decided storage elements corresponding to forward action, and the dot formation pattern indicated by the decided storage elements corresponding to reverse action.

$$E = a \times E1 + b \times E2 + c \times E3 \qquad (3)$$

When the evaluation value E has been calculated, Step S333 through Step S338 are repeated until evaluation values E have been calculated for all of the storage element candidates (empty storage elements) (Step S339). When evaluation values E have been calculated for all of the storage element candidates (YES in Step S339), the dither mask evaluation process has been completed.

When the dither mask evaluation process has been completed as described above (FIG. 18), next, a storage element decision process is executed (FIG. 17, Step S340). Here, the storage element decision process is a process for the decision of an empty storage element to store the target threshold value on the basis of the evaluation value E calculated by the dither mask evaluation process. Concretely, among the evaluation values E calculated in each storage element candidate (empty storage element), its smallest evaluation value E corresponding to the storage element candidate is decided as a storage element candidate storing the target threshold value and the target threshold value is stored in the storage element.

When the storage element decision process is performed, the above Steps S320 to S340 are repeated until storing the threshold value prepared in Step S310 in all of storage elements constituting the temporary dither mask 61 and the dither mask for actual use (Step S350). When the threshold value has been stored in all of the storage elements (Step S350: YES), first, the temporary dither mask 61 has been completed (Step S360).

The temporary dither mask 61 generated by using the above evaluation value E is provided to generate the dot formation pattern having less-visible dots by weighting which corresponds to the sensitivity characteristics VTF with respect to the spatial frequency of the human vision. As a result, in the dot formation pattern generated by the temporary dither mask 61, the distribution of dots formed has a noise characteristic possessing a peak in the spatial frequency region on the higher-frequency side. In other words, the dot formation pattern generated by the temporary dither mask 61 has a blue noise characteristic. Therefore, in the print image printed by the halftone process by using the temporary dither mask 61, the dots are evenly dispersed so as to obtain good smooth print quality with less-visible dots.

Also, by using the above evaluation value E, the temporary dither mask 61 can be provided with a dot formation pattern in which the dots are placed in the dispersion for the overall print images having any one of dots during the forward action, dots during the reverse action or the combination of the dots during the forward action and the dots during the reverse action. When the halftone process is performed by using the temporary dither mask 61, the dispersion properties of the dots during the forward action and the reverse action are maintained even though the shift of the position between the dots during the forward action and the dots during the reverse action occurs. Therefore, the deterioration of the graininess of the print quality can be suppressed.

When the temporary dither mask 61 has been completed, a threshold value shift process is performed (Step S370). The threshold value shift process is a process in which the threshold value with respect to a part of group among the groups set in Step S331 described above is shifted by the predetermined pixels in a predetermine direction in the threshold value placement of the temporary dither mask 61. By performing the threshold value shift process, the dither mask 62 is completed (Step S380). Then, the dither mask generation process is end.

Figure 21:
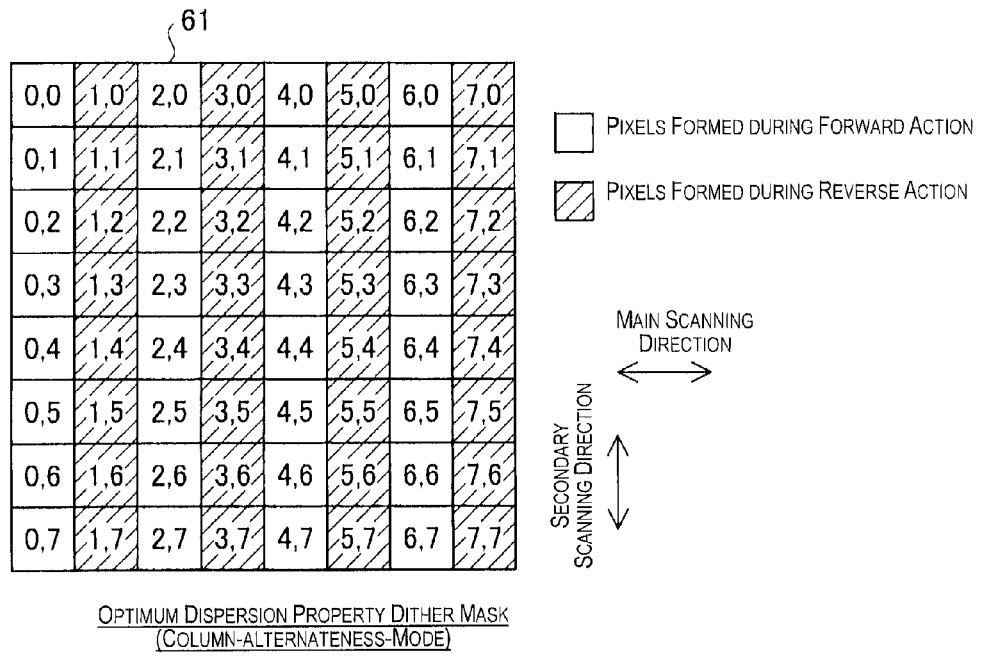
FIG. 21 is a descriptive diagram showing the threshold value arrangement of the temporary dither mask 61.

The threshold value shift process is discussed in detail below. The placement of threshold values in the temporary dither mask 61 is shown in FIG. 21. The temporary dither mask 61 is the dither mask in which the dot dispersion properties are optimized by the method discussed above. Also, it is so-called dispersion properties optimum dither mask. FIG. 21 shows the threshold value placement of the dither mask which is the size of 7×7 pixels. To distinguish the threshold value in each pixel, the number (0, 1) or the like is given with respect to each threshold value in the drawing. For example, the threshold value in (0, 1) indicates the threshold value in number 0 in the main scanning direction (right direction in the drawing) and in number 1 in the secondary scanning direction (downward direction in the direction). Each threshold value constituting the temporary dither mask 61 distinguishes the threshold value applied to pixels in which the dots are formed during the forward action (referred to below as a forward action threshold value) and the threshold value applied to pixels in which the dots are formed during the reverse action (referred to below as a reverse action threshold value). FIG. 21 shows the reverse action threshold value given with hatching. In the drawing, the threshold value placement of the temporary dither mask 61 is in a case in which the dots are arranged by column.

Figure 22:
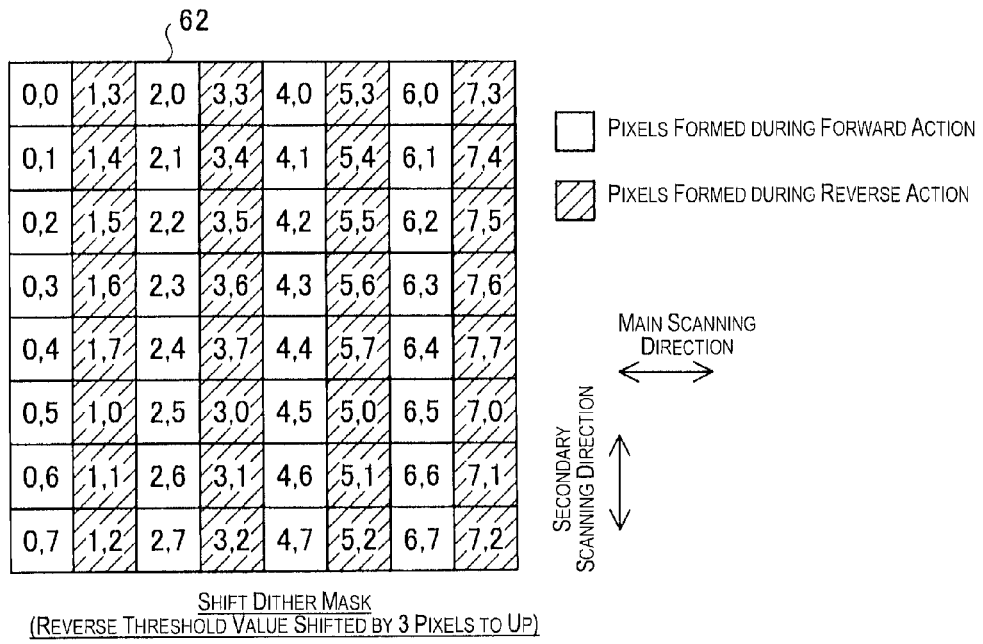
FIG. 22 is a descriptive diagram showing the first example of the threshold value arrangement of the dither mask 62.

FIG. 22 shows a concrete example of the threshold value placement of the dither mask 62 provided by the threshold value shift process with respect to the threshold values placement of the temporary dither mask 61. As shown in the drawing, the threshold value placement of the dither mask 62 has a threshold value placement in which among the forward threshold value and the reverse threshold value, only the reverse threshold value is shifted by 3 pixels in the secondary scanning direction (upper direction in the drawing). Thus, the dither mask 62 is so-called shifted dither mask. Since the dither mask 62 is repeatedly applied in the main scanning direction and in the secondary scanning direction, when the reverse threshold value is shifted by 3 pixels in the upper direction, for example, the threshold values in (1, 0), (1, 1), and (1, 2) are placed in below (1, 7).

Figure 23:
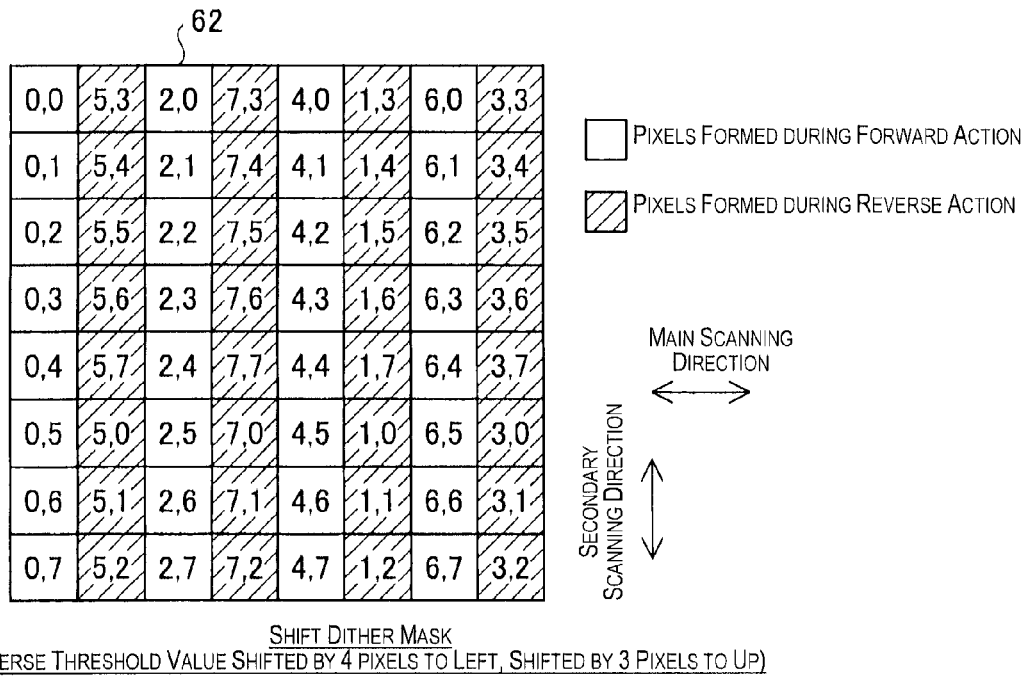
FIG. 23 is a descriptive diagram showing the second example of the threshold value arrangement of the dither mask 62.

FIG. 23 shows another example of the threshold value placement of the dither mask 62. In this example, as shown in the drawing, the threshold value placement of the dither mask 62 has a threshold value placement in which only the reverse threshold value of the temporary dither mask 61 is shifted by 4 pixels in the main scanning direction (left direction in the drawing) and in addition, it is shifted by 3 pixels in the secondary direction (upper direction in the drawing).

Figure 24:
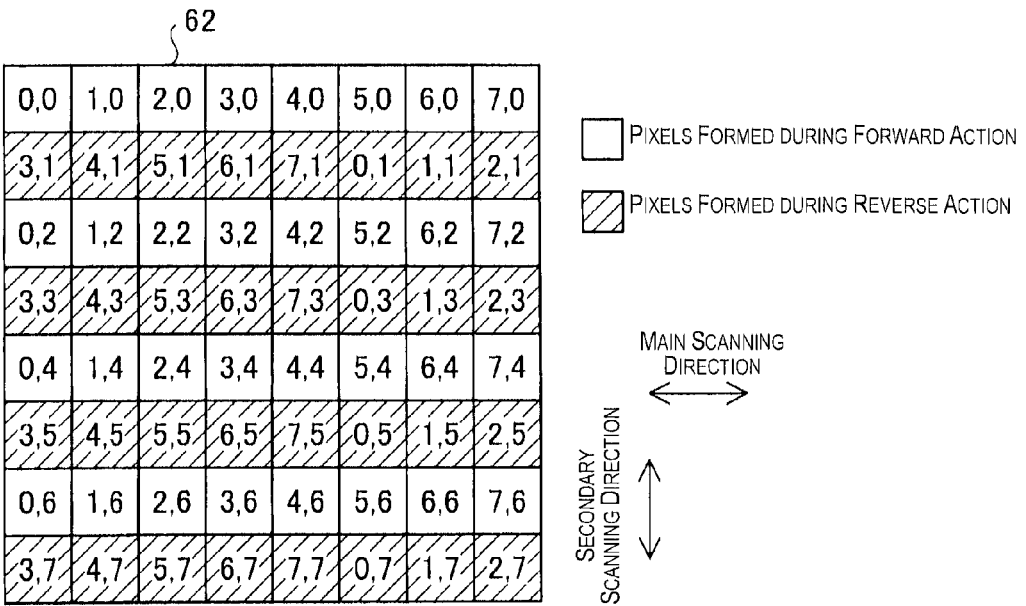
FIG. 24 is a descriptive diagram showing the third example of the threshold value arrangement of the dither mask 62.
Figure 25:
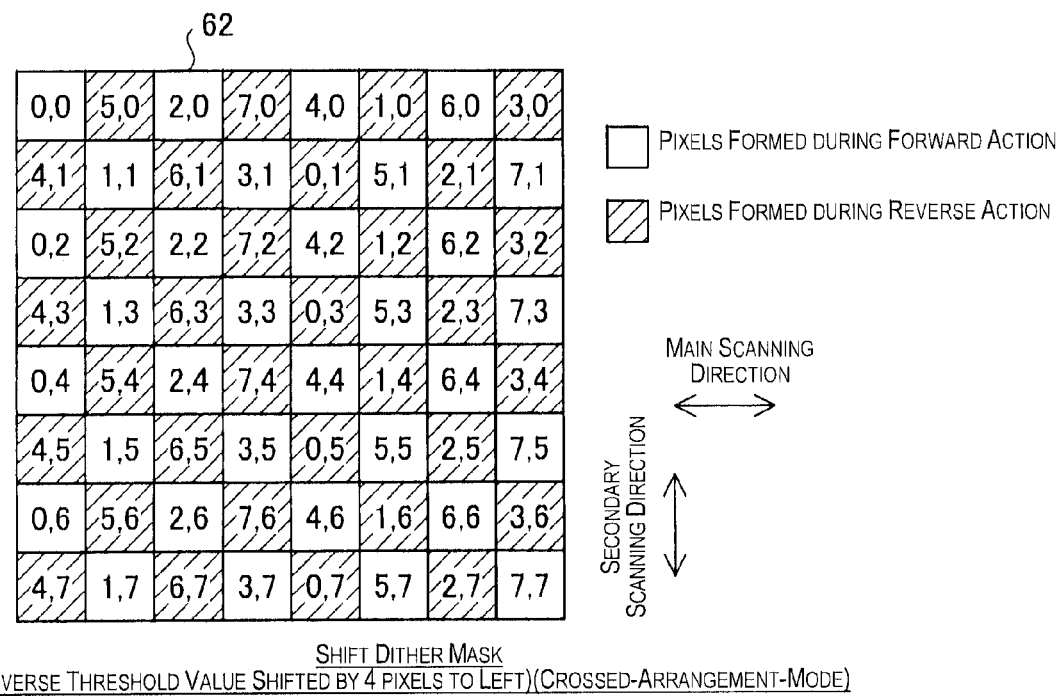
FIG. 25 is a descriptive diagram showing the fourth example of the threshold value arrangement of the dither mask 62.

The threshold value shift process can be applied to the dots formed in the raster arrangement (FIG. 3B) or the dots formed in the crossed arrangement (FIG. 3C) by the same method as the dots formed in the column arrangement. When the dots formed in the raster arrangement is employed, an example of the threshold value placement of the dither mask 62 is shown in FIG. 24. In the examples shown in the drawing, the reverse threshold value of the temporary dither mask 61 is shifted by 3 pixels in the main scanning direction (left direction in the drawing). Also, when the dots formed in the crossed arrangement is employed, an example of the threshold value placement is shown in FIG. 25. In the examples shown in the drawing, the reverse threshold value of the temporary dither mask 61 is shifted by 4 pixels in the main scanning direction (left direction in the drawing).

As described above, the shift direction of the threshold values in the threshold value shift process can be in the main scanning direction or in the secondary scanning direction. Also, it can be in the main scanning direction and the secondary scanning direction. Further, the shift threshold value is not limited to the reverse threshold value but it can be the forward threshold value. Thus, by performing the threshold value shift process, the dispersion properties in the characteristics of the dither mask 62 changes for the worse when compared to the temporary dither mask 61. This means that the paired dot incidence K becomes larger than the temporary dither mask 61. In other words, the same properties as the first embodiment can be obtained.

Also, the shift amount of the threshold value in each direction can be arbitrarily set, but it is preferably set as follows.

When the characteristics of the blue noise are checked and the relative positions of the two pixels in a dither mask are close, the two pixels in which the dots are turned ON/OFF have a strong correlative relationship. In other words, when the dot in one of the two pixels is turned ON, the probability of which the dot in another pixel is turned ON is very low. On the other hand, when the two pixels are fully away from each other, the two pixels in which the dots are turned ON/OFF have very few correlative relationships. When the relative position between the two pixels becomes larger, the probability that the dots in both two pixels are turned ON, that is, the paired dot incidence K, converges to $k^2$ (k is incidence percentage of dots) which is the same in a case of the white noise (see FIG. 11).

In the relationship between the relative position of the two pixels and the paired dot incidence K, and in the print gradation having the problem of density unevenness caused by the position shift, that is, from the lower gradation region to the medium gradation region (for example, 25 to $127/255$), when the relative position between the two pixels has a distance more than 5 pixels, it was confirmed to converge to $k^2$. This means that when the threshold value shift amount becomes more than 5 pixels, the paired dot incidence K converges to $k^2$. On the other hand, the threshold value shift amount is preferably smaller in order to maintain the excellent dot dispersion. When the threshold value shift amount becomes larger, the graininess of the optimized dots as the temporary dither mask 61 is deteriorated.

Because of this, it is preferable to set the upper limit value of the threshold value shift amount. To set the upper limit value, the assumed position shift amount is added to the value of which the paired dot incidence K converges to $k^2$ (5 pixels in the above discussed example). For example, when the actual position shift amount is assumed to be ±2 pixels, the upper limit value of the threshold value shift amount is preferred to set 7 pixels. In such case, for example, the threshold value shift amount can be 5 pixels. In this way, the actual threshold value shift amount when occurring the position shifted by ±2 pixels is within 3 pixels to 7 pixels so that while the deterioration as the graininess of dots is suppressed, the paired dot incidence K can be moved closer to $k^2$ as excellence. However, when the assumed position shift amount is increased even further, the threshold value shift amount also needs to be increased even further. For example, in a case in which the actual position shift amount is −5 pixels, although the threshold value shift amount is set to 5 pixels, the actual threshold value shift amount becomes 0 pixel.

Also, it is preferable that the threshold value shift amount is set to take into account specific properties of the position shift in the printer 20. Concretely, when the position shift of the printer 20 in a specific direction is more likely to occur, it is preferable that the shift amount in a direction different from the specific direction is set larger than the shift amount in the specific direction. In the present embodiment, the printer 20 is a serial printer so that the position shift between dots during the forward action and dots during the reverse action is more likely to occur in the main scanning direction. Thus, it is preferable that the shift amount in the secondary scanning direction is set larger than the shift amount in the main scanning direction. In this way, the variation range in the total amount of the threshold value shift amount and the actual occurrence shift amount, that is, the actual threshold value shift range, is closer to a case in which the position shift does not occur. Thus, the dispersion properties of dots are stable. Also, the threshold value shift amount can be smaller.

For example, the followings are in a case in which the position shifted by ±2 pixels in the main scanning direction is assumed. In the first case, when the threshold value shift amount in the main scanning direction is 6 pixels and the threshold value shift amount in the secondary scanning direction is 0 pixel, the variation range in the total amount of the threshold value shift amount and the actual occurrence position shift amount becomes a range between 4 to 8 pixels in the main scanning direction and a range of 0 pixel in the secondary direction. On the other hand, in the second case, when the threshold value shift amount in the main scanning direction is 0 pixel and the threshold value shift amount in the secondary scanning direction is 4 pixels, the variation range in the total amount of the threshold value shift amount and the actual occurrence position shift amount becomes a range between −2 to 2 pixels in the main scanning direction and a range of 4 pixels in the secondary direction. When comparing the first case and the second case, the second case has smaller shift amount and the deterioration of the graininess is suppressed. In addition, in both the first case and the second case, the actual threshold value shift amount secures more than 4 pixels. As a result, when the position shift in the main scanning direction is more likely to occur, it is preferable that the shift amount in the secondary scanning direction is larger than the shift amount in the main scanning direction.

D-3. Effect

The printer 20 with such configuration performs printing in accordance with the dot data generated by the dither mask 62 in which the threshold value is shifted by the predetermined pixel in the predetermined direction, and the threshold value corresponds to a part of groups among the forward action pixel group and the reverse action pixel group with respect to the threshold value placement of the temporary dither mask 61 which has noise characteristics possessing a peak in the higher frequency side. Thus, even though the position shift of the dots between the pixel groups occurs, it is possible to suppress the change in the coverage of dots in accordance with the direction or the amount of the position shift so that the change in the CIEL*a*b* color space is within the predetermined range which is the same as the first embodiment. As a result, the deterioration of the print quality caused by the occurrence of the unevenness density in the common region of the print image can be suppressed. In addition, the threshold value placement of the temporary dither mask 61 which is the base of the dither mask 62 has noise characteristics possessing a peak in the higher frequency side in the spatial frequency region. The printed image has characteristics indicating similar to so-called blue noise characteristics at least in common region so that the predetermined degree of the graininess can be secured.

Figure 26:
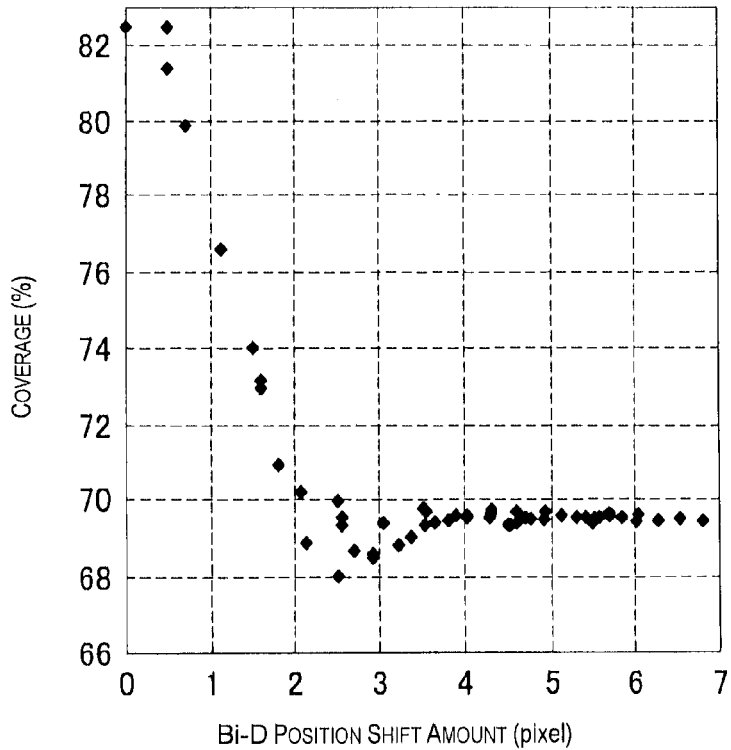
FIG. 26 is a descriptive diagram showing an example of effect of the printer 20.

FIG. 26 shows an example of the concrete effect of the printer 20. FIG. 19 is a simulation result. Concretely, a case in which the Bi-D shift in varying amount occurs in the main scanning direction and the secondary scanning direction is set for the dot formation pattern used the dither mask having excellent blue noise characteristics. The coverage in each case is calculated and is plotted. The horizontal axis in FIG. 26 is the total value of the position shift amount in the main scanning direction and the secondary scanning direction (referred to below as total shift amount).

The followings are the conditions precedent.
1) Gradation value: $80/255$
2) Interlacing process: the dots are formed in a crossed arrangement.
3) Dot size: diameter of dot is twice as the size of distance between pixels.
4) Position shift amount: as described below.

For the position shift amount, 0 pixels and within 0.5 to 5.5 pixels in 1 pixel spacing are respectively employed as the shift amount in the main scanning direction, and 7 ways of the shift amount were set. Also, within 0 to 4 pixels in 0.5 pixel spacing are respectively employed as the shift amount in the secondary scanning direction, and 9 ways of the shift amount were set. In FIG. 9, among the Bi-D shift cases of all combinations (63 ways) of these shift amounts, the coverage in a case in which the total shift amount is less than 7 pixels (51 ways) are plotted.

As shown in FIG. 26, when a case where the total shift amount is 0 pixels and a case where the total shift amount is 2 pixels are compared, the difference in the coverage is more than 10%. On the other hand, when the total shift amount becomes more than 2 pixels, the change amount in the coverage is reduced in accordance with the increase of the total shift amount. When a case where the total shift amount is 2 pixels and a case where the total shift amount is 3 pixels are compared, the change in the coverage is approximately 2%. In addition, when the total shift amount exceeds 5 pixels, the change in the coverage is very stable so that even if the total shift amount is increased, the coverage almost does not change. This is that when the shift amount of the threshold value in a case of generating the dither mask 62 as discussed above is more than 5 pixels, it corresponds that the paired dot incidence K converges to $k^2$.

Here, when the shift amount of the threshold value in a case of generating the dither mask 62 is 5 pixels and if the actual position shift amount is ±2, the actual position shift amount appeared in the print image is in a range of 3 to 7 pixels. In this range, the range of the change in the coverage is less than 2%. On the other hand, when the shift amount of the threshold value in a case of generating the dither mask 62 is 0 pixels, that is, when the well-known temporary dither mask 61 having blue noise characteristics is used, and if the actual position shift amount is ±2, the actual position shift amount appeared in the print image is in a range of −2 to 2 pixels. In this range, the range of the change in the coverage becomes more than 14%.

In the above description, it is clearly understood that the dither mask 62 dramatically suppresses the change in the coverage so that the change in the CIEL*a*b* color space of the printed image can be suppressed in the predetermined range. When the coverage is changed locally, it means that the unevenness of the density occurs in the print image. Thus, when the change in the coverage of the print image is suppressed by using the dither mask 62, it is possible that the occurrence of the unevenness of the density is dramatically suppressed.

The threshold value placement of the threshold value shifted dither mask 62 with respect to the threshold value placement of the temporary dither mask 61 has the same effect as the occurrence of the position shift when the temporary dither mask 61 is used so that the print quality is given as the same effect and the graininess deteriorates more than the temporary dither mask 61. However, the placement of the temporary dither mask 61, which is the base of the dither mask 62, is set to have noise characteristics possessing a peak in the higher frequency side in each of the forward pixel group and the reverse pixel group. Thus, the print image printed by using the dither mask 62 can suppress the deterioration. In other words, the dither mask 62 can suppress the deterioration of the graininess, and the occurrence of the unevenness of the density can be dramatically suppressed.

The dither mask 62 as discussed above is generated by shifting the threshold value corresponding to a part of the pixel groups among the threshold values of the temporary dither mask 61 having excellent blue noise characteristics as discussed above. Thus, the dither mask 62 has predetermined characteristics. In other words, a plurality of dither masks, in which the threshold value in the threshold value placement of the dither mask 62 corresponding to a part of the pixel groups is shifted by varying amount in varying direction, are generated. Among these dither masks, a dither mask shifted by particular amount in a particular direction has excellent blue noise characteristics which are better than the dither mask 62, and the print image has characteristics such as the improvement of the graininess. In other words, it can be said that the dither mask 62 is a dither mask having spatial frequency characteristics which are closer to the blue noise mask than the white noise mask as much as possible while the dither mask 62 maintains the paired dot incidence K which is close to the white noise mask.

E. Modification Examples of Second Embodiment

Modification examples of the second embodiment described above will now be described.

E-1. Modification Example 1

In the second embodiment, in the above Step S331, the pixel groups of the print image are divided into the pixel group of the dots formed during the forward action and the pixel group of the dots formed during the reverse action. With respect to the threshold value placement of the temporary dither mask 61, the threshold value corresponding to either one of the pixel groups is shifted by the predetermined pixels in the predetermined direction, and the dither mask 62 is generated. The divided pixel groups are not limited to the above example, but it is possible that the pixel groups have a different print condition.

For example, when a predetermined area of an image is printed by the number of main scanning of the print head 90, it is possible that the pixel group of the printed image can be divided into pixel groups in which the dots are formed by main scanning differ from each other, among the number of main scanning. For example, the target area as shown in FIG. 3 is constituted by repeating the area where the image completes by passes 1 to 4. Thus, it can be possible that the pixel group of the printed image is divided into four pixel groups 1 to 4 corresponding to each pass. In this case, in the threshold value shift process, when one pixel group, for example, pixel group 1 is a reference, the threshold value corresponding to at least one of other pixel groups 2 to 4 can be shifted. For example, the threshold value corresponding to the pixel group 2 can be shifted by 4 pixels in the main scanning direction, the threshold value corresponding to the pixel group 3 can be shifted by 4 pixels in the secondary scanning direction, and the threshold value corresponding to the pixel group 4 can be shifted by 2 pixels in the main scanning direction and 2 pixels in the secondary scanning direction. The shift amount and the shift direction of the threshold value are arbitrarily set based on the consideration of the position shift incidence characteristics between the passes.

E-2. Modification Example 2

In the second embodiment, the evaluation value E is calculated in all of the print gradation range, and the threshold value placement of the temporary dither mask 61 is decided. However, the threshold value placement can be decided based on the evaluation value E in a part of the print gradation range. For example, in the higher gradation print region where there is no dot dispersion problem, the threshold value placement of the temporary dither mask 61 can be set by another way.

E-3. Modification Example 3

In the second embodiment, there was a configuration that the temporary dither mask 61 and the dither mask 62 are preliminary stored in the EEPROM 60. However, this configuration is not limited. For example, the EEPROM 60 can preliminary store either one of the temporary dither mask 61 or the dither mask 62. In this case, the CPU 40 performs as the dither mask generation part, and it can constitute that the other one is generated from either one of the temporary dither mask 61 or the dither mask 62. By the halftone process, it is not necessary to select a dither mask in accordance with the sort of the print medium. The printer 20 only stores the dither mask 62 so that the dither mask 62 can be fixedly used regardless of any sort of the print medium. Also, another dither mask, which is different from the temporary dither mask 61, and the dither mask 62 can be used to switch each other.

E-4. Modification Example 4

Figure 27:
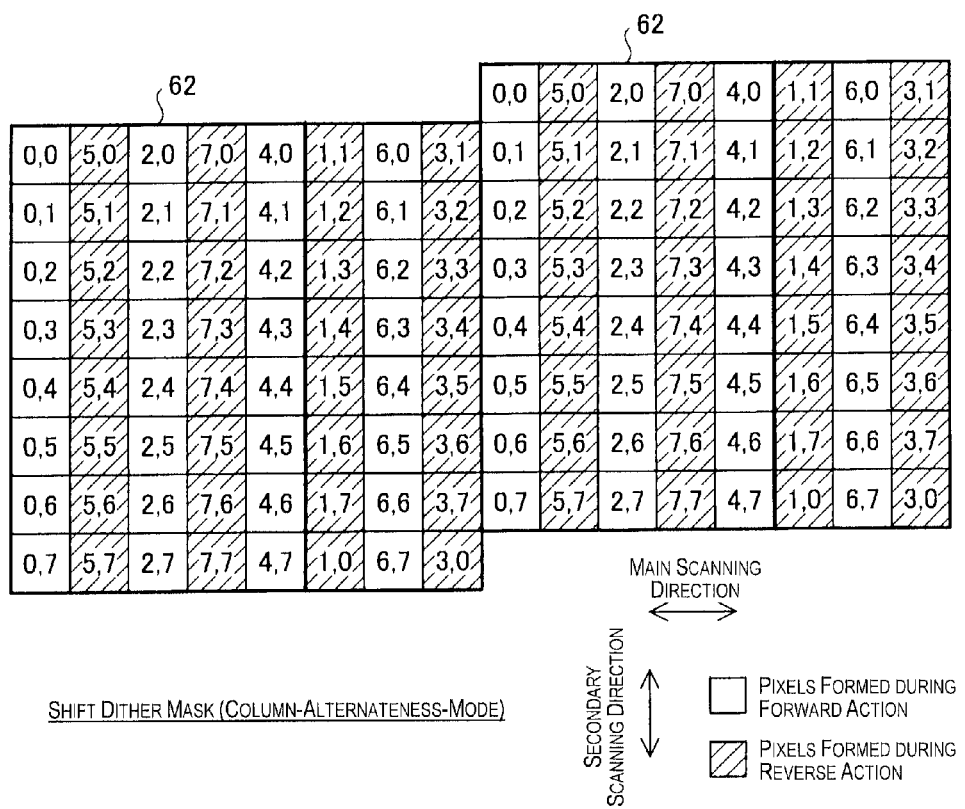
FIG. 27 is a descriptive diagram showing the threshold value arrangement of the dither mask 62 as a deformational example.
Figure 28C:
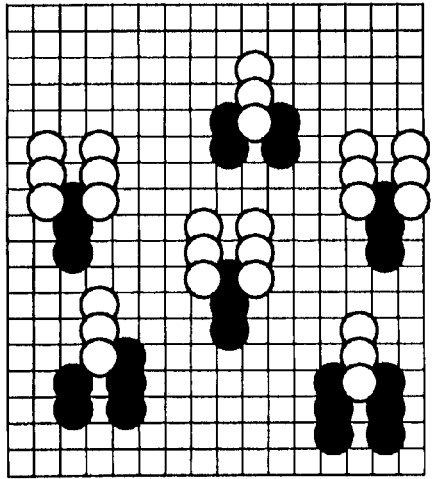
FIG. 28A-E are descriptive diagrams showing the change of the coverage by shifting the dot formation position in the well-known technologies.
Figure 28B:
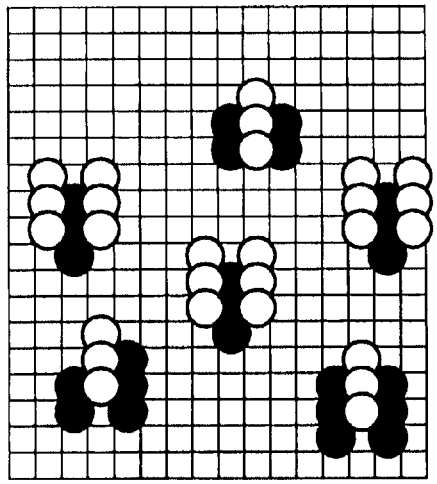
Figure 28E:
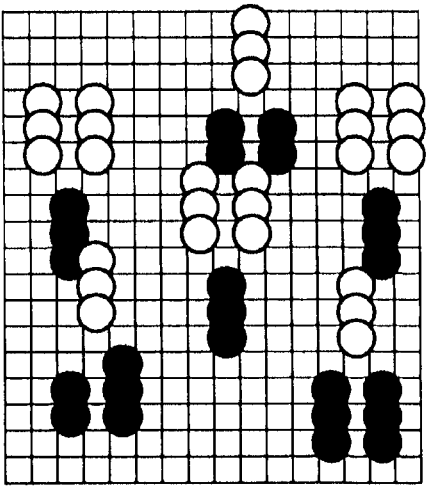
Figure 28A:
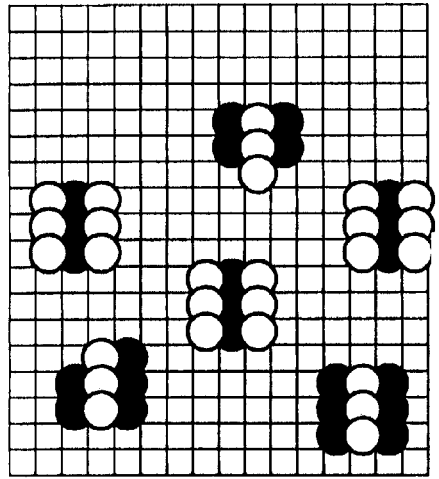
Figure 28D:
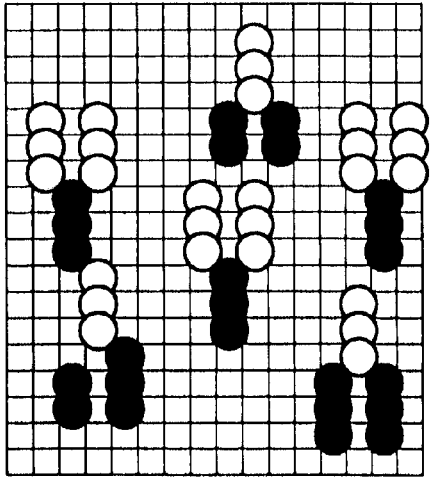

In the halftone process, when the dither mask is applied by repeating number of times in the main scanning direction, the applied position of the dither mask is shifted by the predetermined amount in the secondary scanning direction. The threshold value shift process in this case will be described. FIG. 27 shows an example of the threshold value placement of the dither mask 62 treated by the threshold value shift process. In this example, as shown in the drawing, when the dither mask 62 is applied by repeating number of times in the main scanning direction, this indicates a case of applying the applied position of the dither mask by shifting every one pixel in the secondary scanning direction.

In this example, the reverse action threshold value is shifted by 4 pixels in the main scanning direction (left direction in the drawing) relative to the temporary dither mask 61. Also, in addition to the shift, the threshold values of (1, x) and (3, x) (x is integer 0 to 7) in the reverse action threshold value is shifted by 1 pixel in the secondary scanning direction (upper direction in the drawing). This is because the temporary dither mask 61 is optimized based on the assumption that it is applied by shifting the predetermined amount in the secondary scanning direction. Concretely, for example, when the reverse action threshold value is focused in the temporary dither mask 61, the temporary dither mask 62 is optimized such that the reverse action threshold value is (1, 1) which is adjacent to (7, 0). In the threshold value placement as shown in FIG. 27, the threshold values of (1, x) and (3, x) in the reverse action threshold value are shifted by 1 pixel in the secondary scanning direction in order to maintain the relative relationship of the reverse action threshold value. By this configuration, the conditions precedent of the temporary dither mask 61 is maintained and it is preferable that the deterioration of the graininess can be suppressed.

E-5. Modification Example 5

In the second embodiment, the evaluation value Eq indicates the degree of the dot dispersion and the graininess index is used. However, the evaluation value Eq can be anything as long as the degree of the dot dispersion is evaluated. For example, RMS graininess can be used for the evaluation value Eq. The RMS graininess is well known technology (e.g. Japanese Laid-open Patent Publication No. 2007-174272) so that the detailed description is omitted. A low-pass filter process is performed by using a low-pass filter for a dot density value, and the standard deviation of the dot density value treated by the low-pass filter process is calculated. Alternatively, the dot density after the appropriate low-pass filter such as a weighting value filter, which inversely relates to a distance from a pixel position, can be the evaluation value Eq.

E-6. Modification Example 6

In the embodiments as described above, it shows that the examples are realized as a serial printer for the printing device of the invention. However, in the invention, the dot formation is performed by dividing into a plurality of pixel groups having different print conditions, and at least a part of the dot formation in the plurality of pixel groups is performed in the common region so that the invention widely applies to a printing device to output print images. The different print conditions can be the difference of a timing of the dot formation, a position, a print head, or a nozzle.

For example, the printing device of the invention can be realized as an inkjet type line printer. Concretely, for example, this can be a line printer in which a plurality of the print heads forming dots on a print medium are arranged in accordance with the print range. In the line printer, it can be arranged that a part of the plurality of the print heads, which are adjacent to each other, is superimposed in a direction of the print head arrangement. In this superimposed area, the print image is completed by combining dots formed by two print heads. For the line printer, in Step S331 as described above, it can be divided into each pixel group in which dots are formed by the print heads different from each other, among the plurality of the print heads.

Alternatively, this can be a line printer including nozzles arranged in accordance with the print range and a plurality of nozzle lines discharging ink are arranged in an intersectional direction which intersects a direction of the arranged nozzle line, that is, in a paper carrying direction. In the line printer, the print resolution can be improved by constituting the plurality of nozzle lines. Specifically, the dots are formed by two nozzle lines and they are combined so as to complete the print image. In between the plurality of nozzle lines, when the nozzle positions in the nozzle arrangement direction are the same, the print resolution in a paper carrying direction can be improved. Also, in between the nozzle lines, when the nozzle positions in the nozzle arrangement direction are different, the print resolution in the nozzle arrangement direction can be improved. For the line printer, in Step S331 as described above, it can be divided into each pixel group in which dots are formed by the nozzle lines different from each other, among the plurality of the nozzle lines. In this case, the plurality of nozzle lines can be equipped in one print head, or can be equipped in a different print head individually.

Also, when nozzles constituting one nozzle line are arranged in a zigzag shape in the arrangement direction of the nozzle line, it can be divided into each pixel group in which the dots are formed by two nozzle groups arranging the zigzag shape, that is, two nozzle groups having different positions in the paper carrying direction.

The shift position in the paper carrying direction easily occurs in these line printers. Thus, in the generation of the dither mask 62 by using the line printer, it is better to relatively increase the shift amount in the paper carrying direction and a different direction, that is, a direction intersecting the paper carrying direction.

E-7. Modification Example 7

In the embodiments as discussed above, the printer 20 performs printing individually, but when the printing process is performed in the print system (in the broad sense of the printing device) in which the printer and the computer (computer as a terminal, computer as a print server, or the like) are connected, the computer can perform a part of the printing process as shown in FIG. 2. For example, the printer 20 can print dot data processed by the halftone process in the Raster Image Processor (RIP).

As discussed in the embodiments of the invention, among the constituent elements in the above embodiments, the elements except the elements disclosed in independent claims are additional elements so that it is possible to omit them arbitrarily or it is possible to combine them. Also, the invention is not limited to these embodiments, and it is obvious that the invention performs in various aspects within the requirements of the invention. For example, other than the printing device, the invention can be realized as a dither mask generation method, a printing device production method or the like. Also, in addition to the constitution of performing multiple color printing, it is clear that the invention is realized in the printing device performing black-and-white printing, sepia or the like as a single color printing. In this case, the print head having a nozzle line to discharge single color ink can be used.

In addition, in the printer, it is possible to form more than two sizes of ink droplets such as large and small ink droplets or large, medium and small ink droplets. To control the size of the ink droplet, for example, when the printer comprises a print head which controls the capacity in the ink room by the actuator such as a piezo-element or the like, the ink interface (meniscus) of the nozzle edge can be controlled by the actuator. Alternatively, when the printer includes a print head which discharges ink droplets from the nozzle by using air bubbles generated by heating ink in the heater equipped in the nozzle, the number of drives or the drive power can be controlled so as to control growing air bubbles.

As already discussed, the invention can be applied for the printing device performing the dot formation in the dot concentration form and its printing method. In the printing device of the dot concentration form, the number of dots formed with concentration increases when the gradation value of the image for printing becomes higher. Thus, when printing the image which is divided into a plurality of pixel groups, and the print position shift occurs in each pixel group, the number of dots which are overlapped to each other reduces and the coverage generally increases. The image printed for this changes brightness or the color phase when comparing to the case in which the print position shift between the pixel groups does not occur. In a similar manner as the above described dot dispersion form of the dither mask in which the change in the percentage of overlapping dots are suppressed when the dot formation position is shifted, it is better that the placement of the threshold values in the dot concentration form of the dither mask is decided. A suppression degree (variability region of the color difference) is the same as in a case in which the dot formation is performed in the dot dispersion form.

When the dot concentration form of the dither mask is used, probability of the paired dot in a region where the number of formation dots is few (high brightness region) is set higher comparing to a case in which the dots are formed randomly. By the process which is similar to the process in FIG. 14, the threshold value placement of the dither mask is modified so that this probability is changed in order to come close to the probability of the paired dot formation when the dots are formed randomly.

The printing device or the like in each above described embodiment can suppress the change in L*, a*, b* of the CIEL*a*b* color space in the printed image within the predetermined range by giving the specific characteristics to the dither mask. Thus, it is not necessary to analyze the characteristics of the dither mask and it can determine whether or not the invention is performed. In particular, when the dither mask having a high dispensability is used, as shown the symbol N in FIGS. 7 and 9, L*, a*, b* of the CIEL*a*b* color space changes to exceed the predetermined range in a case of shifting the dot formation position during the forward action and the reverse action. By changing at least one of L*, a*, b*, the print condition can be set until shifting a predetermined value in the dot distance range of $2/720$ inch to $5/720$ inch from the setting of the dot distance 0 between the dots in the first and second groups. In this case, the performance of the invention can be determined when L* is within 2.0, a* is within 0.5, and b* is within 0.5. This type dot formation shift can be easily realized by for example, adjusting the dot formation shift during the forward action and the reverse action in the bi-directional printing. Therefore, existence or non-existence of the performance of the invention can be easily determined by measuring the change of the brightness or the color tone in two images which are printed by changing the dot formation position of the bi-directional printing.

What is claimed is:

1. A printing device for printing and forming dots on a printing medium comprising:
a printing unit that prints an image;
wherein the printing of the image is performed such that when the dots are formed on the printing medium in accordance with dot data indicating existence or non-existence of a dot formation per each pixel, the dot formation is divided into at least first and second pixel groups, and at least a portion of dot formation in the first and second pixel groups is performed in a common region;
wherein the printing unit includes a print head for performing a color printing by multiple color dots in a resolution N (N is a natural number of more than 180) dot per inch (dpi), and when the printing is performed in each of a plurality of conditions of which a relative position between the first pixel group and the second pixel group is different, at least one of following conditions is satisfied;
(A) when the printed image is yellow (RGB value: R=G=255, B=0 to 64, when RGB value is 8 bit conversion), color difference in CIEL*a*b* color space of images printed in each of the plurality of different conditions is less than value 2 as a change of b*;
(B) when the printed image is magenta (RGB value: R=B=255, G=0 to 64, when RGB value is 8 bit conversion), the color difference in CIEL*a*b* color space of the images printed in each of the plurality of different conditions is less than value 0.5 as a change of L* or less than value 0.5 as a change of a*; and
(C) when the printed image is cyan (RGB value: G=B=255, R=0 to 64, when RGB value is 8 bit conversion), the color difference in CIEL*a*b* color space of the images printed in each of the plurality of different conditions is less than value 0.5 as a change of L*.

2. The printing device according to claim 1, wherein in the plurality of conditions, a difference of a dot pitch between a formation position of one dot belonging to the first pixel group and a formation position of dot, which corresponds to the one dot and should be adjacent to the one dot, belonging to the second pixel group is $2/720$ inch to $5/720$ inch.

3. The printing device according to claim 1, wherein print head includes a dot formation element arranged in a pitch corresponding to a print resolution in a width direction of the print medium, while the printing unit feeds the print medium in a direction intersecting the width direction of the print head, the image is formed by using the print head, and the first pixel group includes dots formed by the dot formation element arranged in a predetermined position in a feeding direction of the print medium of the print head, and the second pixel group includes dots formed by the dot formation element arranged in a position different from the predetermined position in the feeding direction of the print medium of the print head.

4. The printing device according to claim 1, wherein the print head is capable of moving relatively in a main scanning direction as the width direction of the print medium, the printing head comprises a plurality of nozzles to discharge ink on the print medium, the nozzles are arranged in a direction intersecting the main scanning direction as a nozzle line, and a plurality of nozzle lines apart from each other is constituted in the main scanning direction, the printing unit forms an image by repeating the main scanning and a secondary scanning as a relative movement of the print medium in a direction intersecting the scan direction, the first and second pixel groups have at least one of relationships of following (I), (II), and (III);

(I) the first pixel group includes dots formed during forward action in the main scanning direction of the print head, and the second pixel group includes dots formed during reverse action in the main scanning direction of the print head;

(II) a pixel group includes dots which are formed by the nozzle lines different from each other among the plurality of nozzle lines; and (III) the first pixel group includes dots formed by one main scanning of the print head, and the second pixel group includes dots formed by another main scanning different from the one main scanning of the print head.

5. The printing device according to claim 1, wherein one of the plurality of conditions is a condition that the dot pitch increases and an occurrence of variation of dot overlapping between the first and second pixel groups converges, and when printing is performed in each of the plurality of conditions including the condition, at least one of following conditions is satisfied;

(a) when the printed image is yellow (RGB value: R=G=255, B=0 to 64, when RGB value is 8 bit conversion), color difference of images printed in each of the plurality of different conditions is less than value 1 in the b*;

(b) when the printed image is magenta (RGB value: R=B=255, G=0 to 64, when RGB value is 8 bit conversion), the color difference of the images printed in each of the plurality of different conditions is less than value 0.3 in the L* or less than value 0.3 in the a*; and (c) when the printed image is cyan (RGB value: G=B=255, R=0 to 64, when RGB value is 8 bit conversion), the color difference of the images printed in each of the plurality of different conditions is less than value 0.3 in the L*.

6. The printing device according to claim 1, wherein the print head is capable of forming more than one type of dots, which are more than two different types in size, in one pixel as the dot formation corresponding to the pixel.

7. The printing device according to claim 1, wherein in addition to color printing by forming multiple color dots, the print head performs single color printing in the same color phase.

8. The printing device according to claim 1, wherein in spatial frequency region, a distribution of the dots formed in the common region has noise characteristics possessing a peak located in higher-frequency side than lower-frequency region which is less than the predetermined spatial frequency.

9. The printing device according to claim 8, wherein the noise characteristics are a blue noise characteristic or a green noise characteristic.

10. The printing device according to claim 1, wherein the distribution of the dots formed in the common region has the distribution in a dot concentration form.

11. A printing method for performing color printing by forming color dots on a print medium in a resolution N (N is a natural number of more than 180) dot per inch (dpi), the printing method comprising:

a printing process to print an image;

wherein the printing process includes performing the printing of the image such that when the dots are formed on the printing medium in accordance with dot data indicating existence or non-existence of a dot formation per each pixel, the dot formation is divided into at least first and second pixel groups, and at least a portion of dot formation in the first and second pixel groups is performed in a common region;

wherein the printing process includes performing in each of a plurality of conditions of which a relative position between the first pixel group and the second pixel group is different, at least one of following conditions is satisfied;

(A) when the printed image is yellow (RGB value: R=G=255, B=0 to 64, when RGB value is 8 bit conversion), color difference in CIEL*a*b* color space of images printed in each of the plurality of different conditions is less than value 2 as a change of b*;

(B) when the printed image is magenta (RGB value: R=B=255, G=0 to 64, when RGB value is 8 bit conversion), the color difference in CIEL*a*b* color space of the images printed in each of the plurality of different conditions is less than value 0.5 as a change of L* or less than value 0.5 as a change of a*; and (C) when the printed image is cyan (RGB value: G=B=255, R=0 to 64, when RGB value is 8 bit conversion), the color difference in CIEL*a*b* color space of the images printed in each of the plurality of different conditions is less than value 0.5 as a change of L*.

12. A non-transitory computer readable medium storing a computer a program executed by a computer to perform color printing by forming color dots on a print medium in a resolution N (N is a natural number of more than 180) dot per inch (dpi) comprising:

a printing function to print an image;

wherein the printing function includes performing the printing of the image such that when the dots are formed on the printing medium in accordance with dot data indicating existence or non-existence of a dot formation per each pixel, the dot formation is divided into at least first and second pixel groups, and at least a portion of dot formation in the first and second pixel groups is performed in a common region;

wherein the printing function includes performing in each of a plurality of conditions of which a relative position between the first pixel group and the second pixel group is different, at least one of following conditions is satisfied;

(A) when the printed image is yellow (RGB value: R=G=255, B=0 to 64, when RGB value is 8 bit conversion), color difference in CIEL*a*b* color space of images printed in each of the plurality of different conditions is less than value 2 as a change of b*;

(B) when the printed image is magenta (RGB value: R=B=255, G=0 to 64, when RGB value is 8 bit conversion), the color difference in CIEL*a*b* color space of the images printed in each of the plurality of different conditions is less than value 0.5 as a change of L* or less than value 0.5 as a change of a*; and (C) when the printed image is cyan (RGB value: G=B=255, R=0 to 64, when RGB value is 8 bit conversion), the color difference in CIEL*a*b* color space of the images printed in each of the plurality of different conditions is less than value 0.5 as a change of L*.

13. A printing system including a computer and a printing device connected with the computer comprising:

a printing unit that prints an image;

wherein the printing of the image is performed such that when the dots are formed on the printing medium in accordance with dot data indicating existence or non-existence of a dot formation per each pixel, the dot formation is divided into at least first and second pixel groups, and at least a portion of dot formation in the first and second pixel groups is performed in a common region;

wherein the printing unit includes a print head for performing a color printing by multiple color dots in a resolution N (N is a natural number of more than 180) dot per inch (dpi), and when the printing is performed in each of a plurality of conditions of which a relative position between the first pixel group and the second pixel group is different, at least one of following conditions is satisfied;

(A) when the printed image is yellow (RGB value: R=G=255, B=0 to 64, when RGB value is 8 bit conversion), color difference in CIEL*a*b* color space of images printed in each of the plurality of different conditions is less than value 2 as a change of b*;

(B) when the printed image is magenta (RGB value: R=B=255, G=0 to 64, when RGB value is 8 bit conversion), the color difference in CIEL*a*b* color space of the images printed in each of the plurality of different conditions is less than value 0.5 as a change of L* or less than value 0.5 as a change of a*; and (C) when the printed image is cyan (RGB value: G=B=255, R=0 to 64, when RGB value is 8 bit conversion), the color difference in CIEL*a*b* color space of the images printed in each of the plurality of different conditions is less than value 0.5 as a change of L*.

* * * * *